(12) United States Patent
Chopra et al.

(10) Patent No.: US 10,942,779 B1
(45) Date of Patent: Mar. 9, 2021

(54) METHOD AND SYSTEM FOR COMPLIANCE MAP ENGINE

(71) Applicant: EMC IP Holding Company LLC, Hopkinton, MA (US)

(72) Inventors: Shelesh Chopra, Bangalore (IN); Gururaj Kulkarni, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/796,013

(22) Filed: Oct. 27, 2017

(51) Int. Cl.
  *G06F 15/16* (2006.01)
  *G06F 9/50* (2006.01)
  *H04L 29/08* (2006.01)

(52) U.S. Cl.
  CPC ............ *G06F 9/505* (2013.01); *G06F 9/5016* (2013.01); *G06F 9/5083* (2013.01); *G06F 9/5094* (2013.01); *H04L 67/1008* (2013.01)

(58) Field of Classification Search
  CPC ........ G06F 3/061; G06F 3/065; G06F 3/0619; G06F 9/4881; G06F 11/1402; G06F 9/50; G06F 9/5072; G06F 9/5077; G06F 11/2007; G06F 9/5083; G06F 11/1451; G06F 11/1464; G06F 16/11; H04L 12/2854; H04L 45/245; H04L 47/781; H04L 67/1008
  See application file for complete search history.

(56) References Cited

U.S. PATENT DOCUMENTS

| | | |
|---|---|---|
| 5,493,689 A | 2/1996 | Waclawsky et al. |
| 5,606,693 A | 2/1997 | Nilsen et al. |
| 5,668,986 A | 9/1997 | Nilsen et al. |
| 6,298,451 B1 | 10/2001 | Lin |
| 6,421,317 B1 | 7/2002 | Denecheau et al. |

(Continued)

FOREIGN PATENT DOCUMENTS

EP  2677721 A1  12/2013

OTHER PUBLICATIONS

"Defenders of the Virtual World"; EMC Corporation, EMC Backup, Recovery & Archive Solutions, Backup Recovery Systems Division; Jun. 7, 2012 (59 pages).

(Continued)

*Primary Examiner* — Dustin Nguyen
(74) *Attorney, Agent, or Firm* — Chamberlain, Hrdlicka, White, Williams & Aughtry

(57) ABSTRACT

A method for assigning clients to backup resources of a backup pool includes receiving backup resource requests from the clients. The method includes assigning a portion of the clients to a first backup resource of the backup pool while the first backup resource is not overloaded. The method includes after assigning the portion of the clients, obtaining status information for the first backup resource of the backup pool. The method includes making a first determination that the first backup resource is overloaded based on the status information and a load policy. The method includes in response to the first determination, determining that an attribute of the first backup resource is available for reconfiguration. The method includes reconfiguring the attribute of the first backup resource to obtain a reconfigured backup resource. The method includes assigning a client, which has not been assigned to the backup resources, to the reconfigured backup resource.

15 Claims, 15 Drawing Sheets

(56) References Cited

U.S. PATENT DOCUMENTS

| | | |
|---|---|---|
| 6,665,812 B1 | 12/2003 | Blumenau et al. |
| 6,826,711 B2 | 11/2004 | Moulton et al. |
| 7,246,207 B2 | 7/2007 | Kottomtharayil et al. |
| 7,263,529 B2 | 8/2007 | Cordery et al. |
| 7,302,450 B2 | 11/2007 | Benedetti et al. |
| 7,315,923 B2 | 1/2008 | Retnamma et al. |
| 7,343,453 B2 | 3/2008 | Prahlad et al. |
| 7,346,686 B2 | 3/2008 | Albert et al. |
| 7,590,736 B2 | 9/2009 | Hydrie |
| 7,664,847 B2 | 2/2010 | Colrain et al. |
| 7,954,143 B2 | 5/2011 | Aaron |
| 8,122,146 B1 | 2/2012 | Lu |
| 8,156,086 B2 | 4/2012 | Lu et al. |
| 8,156,502 B1 | 4/2012 | Blanding |
| 8,209,696 B2 | 6/2012 | Ferguson et al. |
| 8,286,174 B1* | 10/2012 | Schmidt ............... G06F 9/5077 709/226 |
| 8,375,396 B2 | 2/2013 | Pooni et al. |
| 8,387,054 B1* | 2/2013 | Zeis ..................... G06F 9/4881 709/226 |
| 8,412,900 B1 | 4/2013 | Sano et al. |
| 8,458,210 B2 | 6/2013 | Arifuddin et al. |
| 8,549,247 B2 | 10/2013 | Satoyama et al. |
| 8,578,120 B2 | 11/2013 | Attarde et al. |
| 8,656,047 B1 | 2/2014 | Lu |
| 8,695,012 B2 | 4/2014 | Kanso et al. |
| 8,782,256 B2 | 7/2014 | Dec et al. |
| 8,965,921 B2 | 2/2015 | Gajic |
| 8,972,326 B2 | 3/2015 | Prathaban et al. |
| 9,032,090 B1 | 5/2015 | Lu |
| 9,069,482 B1* | 6/2015 | Chopra .................. G06F 3/065 |
| 9,141,435 B2 | 9/2015 | Wein |
| 9,172,750 B2 | 10/2015 | Bulkowski et al. |
| 9,235,579 B1* | 1/2016 | Suarez ................... G06F 16/11 |
| 9,356,877 B1 | 5/2016 | Lu |
| 9,372,637 B1 | 6/2016 | Alatorre et al. |
| 9,444,884 B2 | 9/2016 | Newton |
| 9,489,270 B2 | 11/2016 | Anglin et al. |
| 9,519,432 B1 | 12/2016 | Haustein et al. |
| 9,672,116 B1 | 6/2017 | Chopra et al. |
| 9,838,332 B1* | 12/2017 | Smith ................ G06F 11/1402 |
| 9,954,785 B1 | 4/2018 | Lu |
| 10,013,189 B1* | 7/2018 | Yang .................... G06F 3/0619 |
| 10,250,488 B2* | 4/2019 | Cropper ............... H04L 45/245 |
| 10,412,022 B1* | 9/2019 | Tang ..................... H04L 47/781 |
| 10,423,459 B1* | 9/2019 | Jacques de Kadt ...... G06F 9/50 |
| 2001/0054095 A1 | 12/2001 | Kampe et al. |
| 2002/0194345 A1 | 12/2002 | Lu |
| 2003/0224781 A1 | 12/2003 | Milford et al. |
| 2004/0153708 A1 | 8/2004 | Joshi et al. |
| 2004/0186844 A1 | 9/2004 | Muhlestein |
| 2005/0010727 A1 | 1/2005 | Cuomo et al. |
| 2005/0033818 A1 | 2/2005 | Jardin |
| 2005/0149940 A1 | 7/2005 | Calinescu et al. |
| 2006/0101224 A1* | 5/2006 | Shah ..................... G06F 9/5077 711/173 |
| 2007/0180314 A1 | 8/2007 | Kawashima et al. |
| 2007/0198797 A1* | 8/2007 | Kavuri ................... G06F 3/061 711/165 |
| 2007/0220319 A1 | 9/2007 | Desai |
| 2008/0115190 A1 | 5/2008 | Aaron |
| 2008/0140960 A1* | 6/2008 | Basler ................ G06F 11/1464 711/162 |
| 2008/0222297 A1* | 9/2008 | Mengerink ......... H04L 12/2854 709/227 |
| 2009/0070489 A1 | 3/2009 | Lu |
| 2009/0144388 A1 | 6/2009 | Gross et al. |
| 2009/0164832 A1 | 6/2009 | Kanso et al. |
| 2010/0017445 A1 | 1/2010 | Kobayashi |
| 2011/0022812 A1 | 1/2011 | van der Linden et al. |
| 2011/0153941 A1 | 6/2011 | Spatscheck et al. |
| 2011/0178831 A1 | 7/2011 | Ravichandran |
| 2012/0059934 A1 | 3/2012 | Rafiq et al. |
| 2012/0117028 A1 | 5/2012 | Gold et al. |
| 2012/0204187 A1* | 8/2012 | Breiter .................. G06F 9/5072 718/105 |
| 2012/0254443 A1* | 10/2012 | Ueda ..................... G06F 9/5083 709/226 |
| 2013/0174177 A1 | 7/2013 | Newton |
| 2014/0025796 A1 | 1/2014 | Vibhor |
| 2014/0089511 A1 | 3/2014 | Mclean |
| 2014/0211698 A1 | 7/2014 | Aguirre et al. |
| 2014/0297611 A1 | 10/2014 | Abbour et al. |
| 2014/0304412 A1 | 10/2014 | Prakash et al. |
| 2014/0331078 A1* | 11/2014 | Cohen ................ G06F 11/2007 714/4.11 |
| 2014/0337285 A1 | 11/2014 | Gokhale et al. |
| 2015/0067353 A1 | 3/2015 | Hui |
| 2015/0067354 A1 | 3/2015 | Hui |
| 2015/0286519 A1 | 10/2015 | Huang et al. |
| 2016/0092311 A1 | 3/2016 | Bushman |
| 2016/0162369 A1* | 6/2016 | Ahn .................... G06F 11/1451 707/654 |
| 2016/0378552 A1* | 12/2016 | Taylor .................. G06F 9/5083 718/105 |
| 2016/0378614 A1 | 12/2016 | Thanasekaran |
| 2017/0371562 A1 | 12/2017 | Delaney et al. |
| 2019/0356728 A1* | 11/2019 | Devilbiss ............ H04L 67/1008 |

OTHER PUBLICATIONS

"EMC® NetWorker® Module for Microsoft for Exchange Server VSS, Release 8.2, User Guide"; EMC Corporation; 2014 (150 pages).

Renata Slota et al., "Prediction and Load Balancing System for Distributed Storage"; Scalable Computing: Practice and Experience (SCPE); vol. 11, No. 2; pp. 121-130; 2010.

Extended European Search Report issued in corresponding Application No. EP19169660.8, dated Aug. 30, 2019. (8 pages).

\* cited by examiner

US 10,942,779 B1

METHOD AND SYSTEM FOR COMPLIANCE MAP ENGINE

BACKGROUND

Computing devices or processes generate, use, and store data. In order to preserve data, computing devices or processes may routinely schedule backup and archiving operations of its stored data. A backup operation may either be a full backup session, where every file is copied to archive media, or it may be an incremental backup session, where less than every file is copied. Full backup sessions may be periodically scheduled, and incremental backups may be scheduled between each full backup. Since an incremental backup only includes the changes to the file system since the previous backup session, it may take less time than a full backup.

SUMMARY

In one aspect, a method for assigning clients to backup resources of a backup pool in accordance with one or more embodiments of the invention includes receiving backup resource requests from the clients; assigning a portion of the clients to a first backup resource of the backup pool while the first backup resource is not overloaded; after assigning the portion of the clients, obtaining status information for the first backup resource of the backup pool; making a first determination that the first backup resource is overloaded based on the status information and a load policy; in response to the first determination, determining that an attribute of the first backup resource is available for reconfiguration; reconfiguring the attribute of the first backup resource to obtain a reconfigured backup resource; and assigning a client, which has not been assigned to the backup resources, to the reconfigured backup resource.

In one aspect, a non-transitory computer readable medium in accordance with one or more embodiments of the invention includes computer readable program code, which when executed by a computer processor enables the computer processor to perform a method for assigning clients to backup resources in a backup pool, the method includes receiving backup resource requests from the clients; assigning a portion of the clients to a first backup resource of the backup pool while the first backup resource is not overloaded; after assigning the portion of the clients, obtaining status information for the first backup resource of the backup pool; making a first determination that the first backup resource is overloaded based on the status information and a load policy; in response to the first determination, determining that an attribute of the first backup resource is available for reconfiguration; reconfiguring the attribute of the first backup resource to obtain a reconfigured backup resource; and assigning a client, which has not been assigned to the backup resources, to the reconfigured backup resource.

In one aspect, a system in accordance with one or more embodiments of the invention includes clients, a backup pool, and a resource controller. The backup pool includes backup resources. The resource controller is in communication with the clients and the backup pool. The resource controller includes a processor. The processor receives backup resource requests from the clients; assigns a portion of the clients to a first backup resource of the backup pool while the first backup resource is not overloaded; after assigning the portion of the clients, obtains status information for the first backup resource of the backup pool; makes a first determination that the first backup resource is overloaded based on the status information and a load policy; in response to the first determination, determines that an attribute of the first backup resource is available for reconfiguration; reconfigures the attribute of the first backup resource; and assigns a client, which has not been assigned to the backup resources, to the reconfigured backup resource.

DETAILED DESCRIPTION

Figure 1:
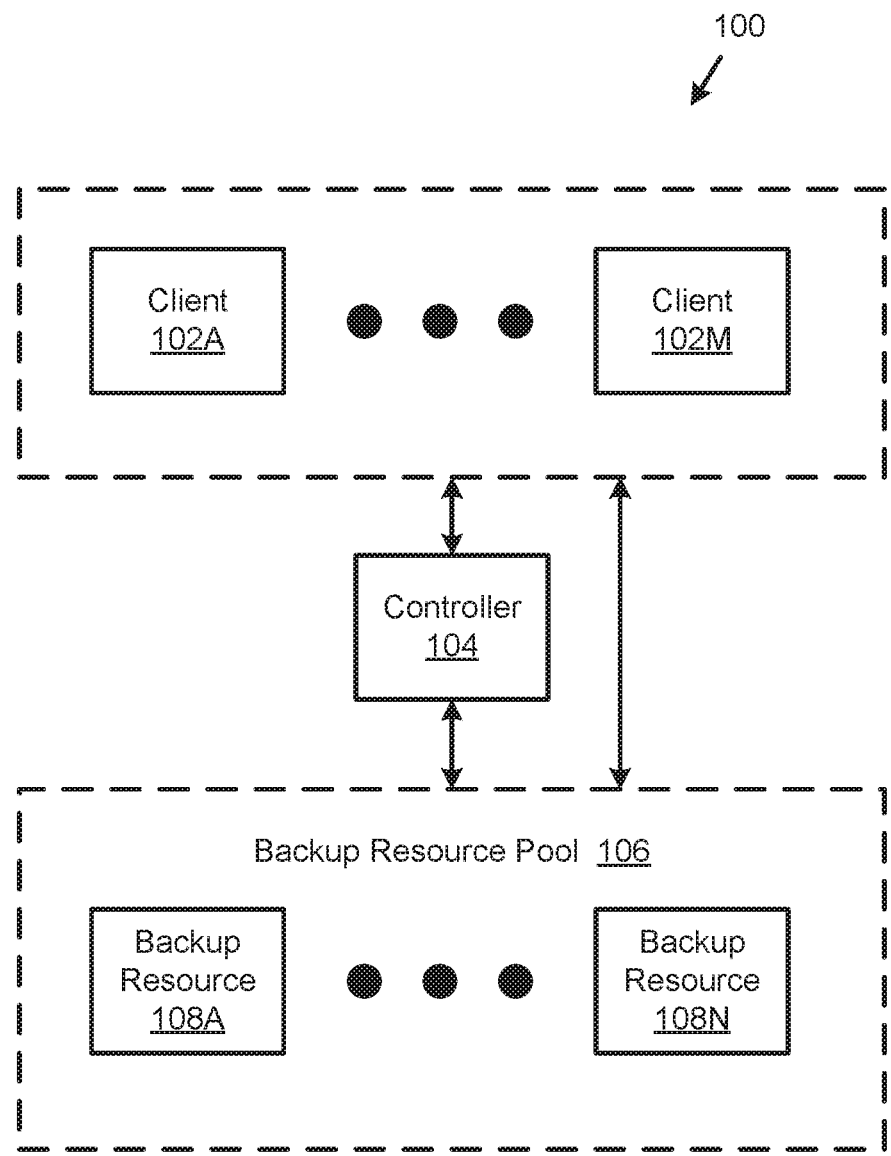
FIG. 1 shows a diagram of a system for assigning clients to backup resources in a backup pool in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-11, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to methods and systems for providing file storage and/or backup/archive services to clients. More specifically, embodiments of the technology relate to monitoring the client load of backup resources and taking measures to mitigate the number of backup resources that exhibit an overloaded load state. As used herein, load state or client load refers to the amount of work the backup resource performs to provide services to its assigned clients and indicates whether/to what extent the backup resource may take on new clients without becoming overloaded. The work performed by the backup resource may be measured by load parameters, such as CPU or memory utilization, as further described herein. The background services performed by the backup resources in a backup resource pool (e.g., data deduplication, compression, incremental storage, etc.) are resource intensive, and the performance of the background services directly impacts the service experienced by the clients (e.g., file transfer rate, latency, etc.) assigned to the backup resources. Monitoring the client load of the backup resources before assigning a client to a backup resource and taking measures to mitigate an overloaded backup resource can alleviate resource bottlenecks (such as abnormally long read/write times, deduplication times, compression times, response times, etc.) in the interaction between the clients and backup resources.

The measures taken to mitigate an overloaded backup resource may include reconfiguring the overloaded backup resources by increasing an attribute of the backup resource, including but not limited to increasing a quantity of processors, memory capacity, or persistent storage capacity. The measures may include adding an additional backup resource to the backup resource pool to increase the client capacity of the backup resource pool. An additional backup resource may be added when it is determined that no backup resources are available for reconfiguration. The measures may also include alerting an operator of an overloaded backup resource by updating a visual representation of the backup resource to indicate that the backup resource is overloaded. This alert may allow the operator to engage in other corrective measures.

FIG. 1 shows a diagram of a system in accordance with one or more embodiments of the invention. The system (100) includes clients (102A, 102M), a resource controller (104), and a backup resource pool (106). The backup resource pool (106) includes backup resources (108A, 108N). The system (100) may include any number of clients (102A-102M) or backup resources (108A-108N).

The clients (102A, 102M) are operably connected to both of the resource controller (104) and the backup resource pool (106). The operable connections between the aforementioned components of the system (100) may be implemented using any combination of wired or wireless communication interfaces and/or protocols.

The controller (104) is operably connected to the clients (102A, 102M) and the backup resource pool (106). The operable connections between the aforementioned components of the system (100) may be implemented using any combination of wired or wireless communication interfaces or protocols. Each component of the system (100) is described below.

In one or more embodiments of the invention, the clients (102A, 102M) may store data using the backup resource pool (106). More specifically, the clients (102A, 102M) may store data using a single backup resource (108A, 108N) of the backup resource pool (106). For example, a client may be assigned to a backup resource of the backup resource pool (106). Once assigned, the client may send data to the assigned backup resource for storage. As will be discussed below, the resource controller (104) may assign clients to backup resources.

The data stored by the clients (102A, 102M) via the backup resource pool (106) includes, but is not limited to, text files, image files, audio files, and video files. In one or more embodiments of the invention, the clients (102A, 102M) may utilize the backup resource pool (106) as an external data storage, an archive storage, a media server, and/or a backup storage. An external data storage may be utilized by a client to store any type of data. An archive data storage may be utilized by a client to store copies of important files such as, for example, drafts of documents. A media server may be utilized by a client to store and/or provide media files to which the client has access rights. A backup storage may be utilized by a client to store copies of files stored on a local storage of the client or another computing device.

In one or more embodiments of the invention, the clients (102A, 102M) may be computing devices. The computing devices may be, for example, mobile phones, tablet computers, laptop computers, desktop computers, or servers. The computing devices may include one or more processors, memory (e.g., random access memory), and persistent storage (e.g., disk drives, solid state drives, etc.), see, e.g., the computing device of FIG. 11. The persistent storage may store computer instructions, e.g., computer code, that when executed by the processor(s) of the computing device cause the computing device to perform the functions described in this application and the method illustrated in FIG. 3. The clients (102A, 102M) may be other types of computing devices without departing from the invention.

In one or more embodiments of the invention, the clients (102A, 102M) may be virtual machines, or other virtual entity that utilizes physical computing resources, executing on one or more computing devices. The computing devices may be, for example, mobile phones, tablet computers, laptop computers, desktop computers, cloud computing systems, computing clusters, or servers. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to execute a virtual machines that perform the functions described in this application and the method illustrated in FIG. 3.

In one or more embodiments of the invention, the resource controller (104) may assign clients (104A, 104M) to backup resources (108A, 108N) of the backup pool (106). The resource controller (104) may assign the clients (104A, 104M) in a manner designed to reduce overloading of the backup resources (108A, 108N) of the backup pool (106).

In one or more embodiments of the invention, the resource controller (104) may monitor a load state of the backup resources (108A, 108N). The resource controller (104) may assign clients based on the monitored load state to reduce overloading of the backup resources (108A, 108N).

In one or more embodiments of the invention, the resource controller (104) may add a new backup resource to the backup resource pool based on the monitored load state of the backup resources (108A, 108N). Adding a new backup resource may reduce overloading of the backup resources (108A, 108N) by expanding the quantity of backup resources (108A, 108N) to which clients may be assigned.

Figure 11:
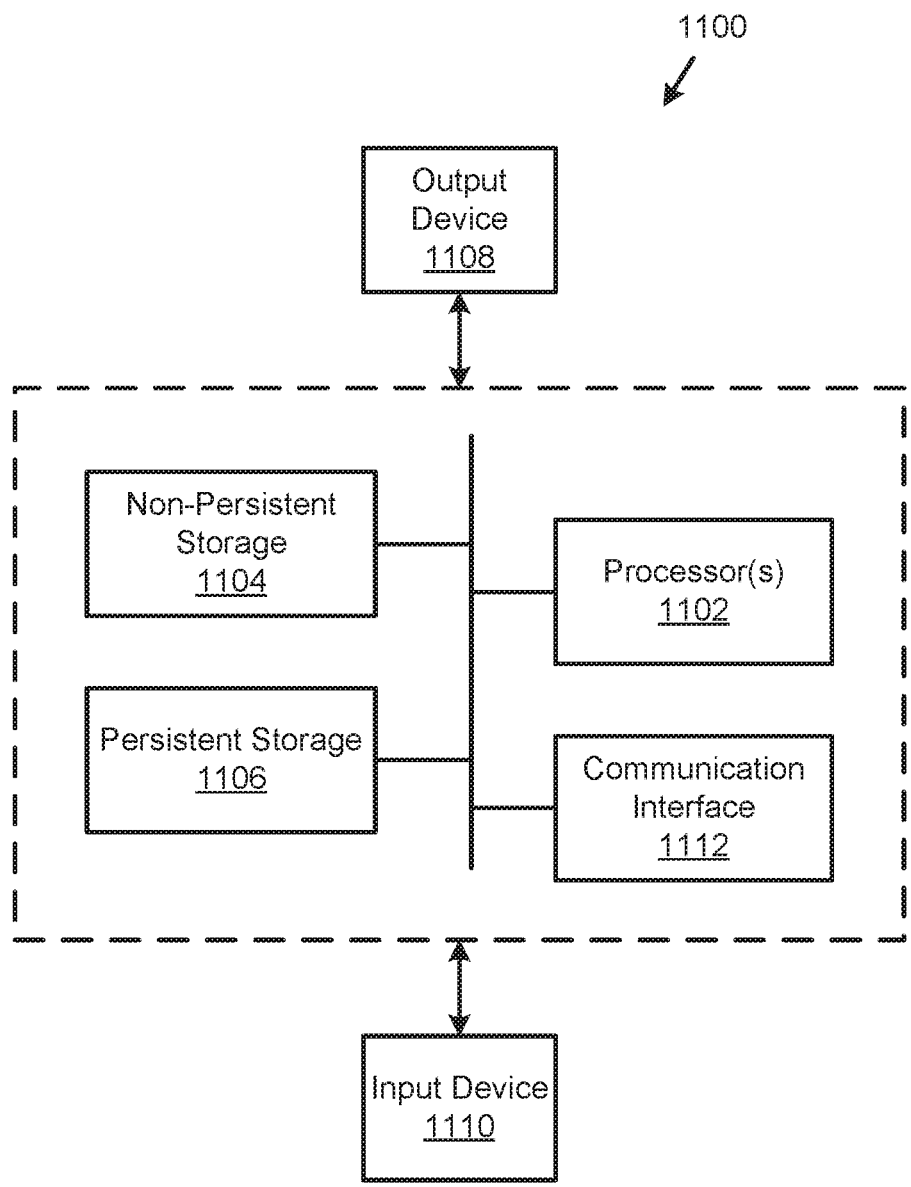
FIG. 11 shows a diagram of a computing device in accordance with one or more embodiments.

In one or more embodiments of the invention, the resource controller (104) may be a computing device, see, e.g., the computing device of FIG. 11. The computing device may be, for example, a mobile phone, tablet computer, laptop computer, desktop computer, cloud computing system, computing cluster, or server. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and the methods illustrated in FIGS. 4-5C. The resource controller (104) may be another type of computing device without departing from the invention.

In one or more embodiments of the invention, the resource controller (104) may be a virtual machine, or other virtual entity that utilizes physical computing resources, executing on one or more computing devices. The computing devices may be, for example, mobile phones, tablet computers, laptop computers, desktop computers, cloud computing systems, computing clusters, or servers. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to execute a virtual machines that perform the functions described in this application and the methods illustrated in FIGS. 4-5C.

Figure 4:
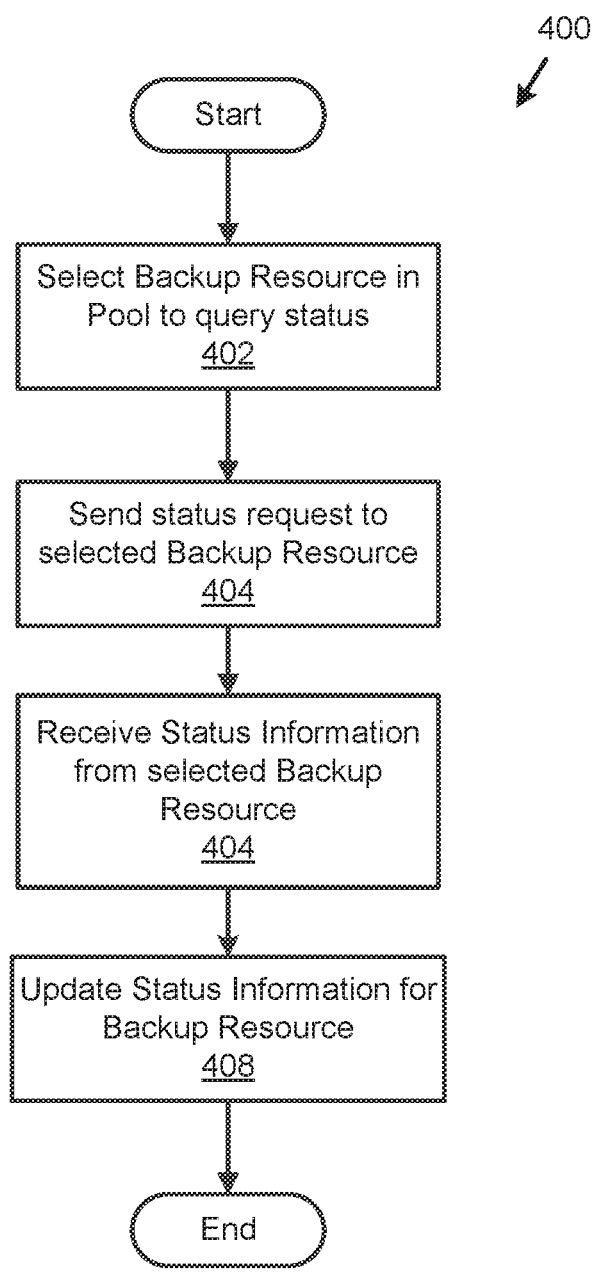
FIG. 4 shows a flowchart for obtaining the status information for a backup resource in accordance with one or more embodiments of the invention.
Figure 5A:
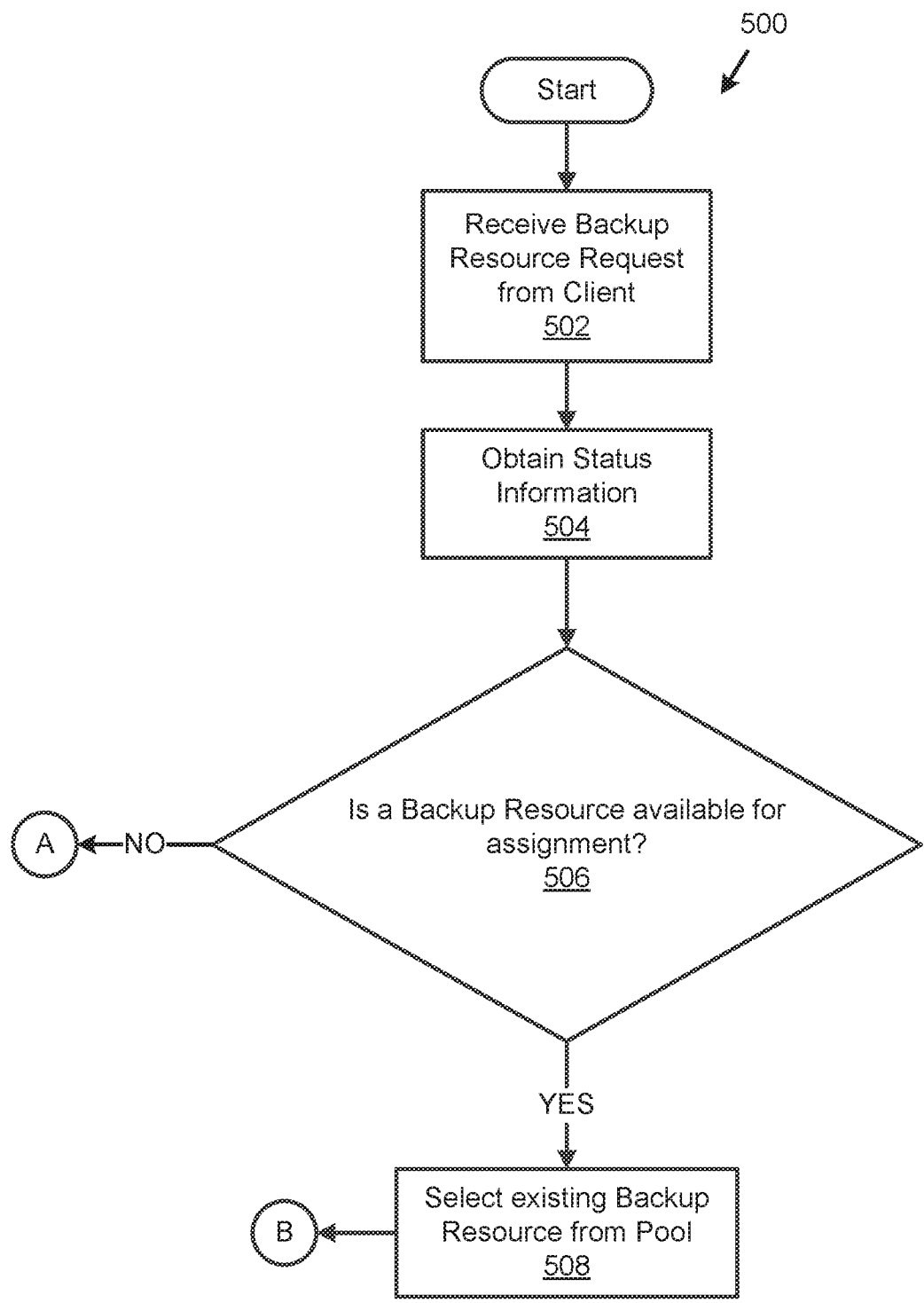
FIG. 5A shows a first portion of a flowchart for implementing the client assignment in accordance with one or more embodiments of the invention.
Figure 5B:
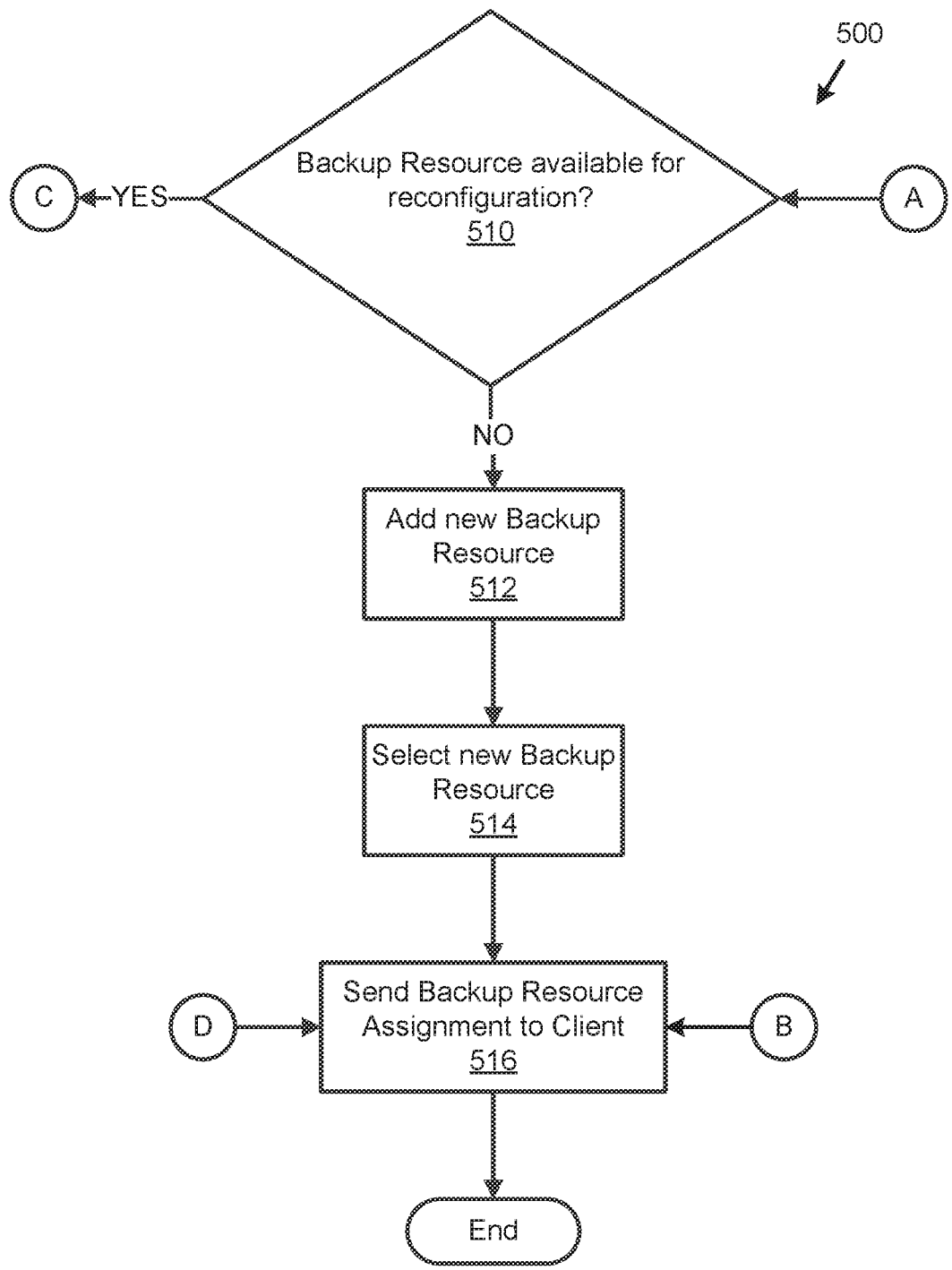
FIG. 5B shows a second portion of a flowchart for implementing the client assignment in accordance with one or more embodiments of the invention.
Figure 5C:
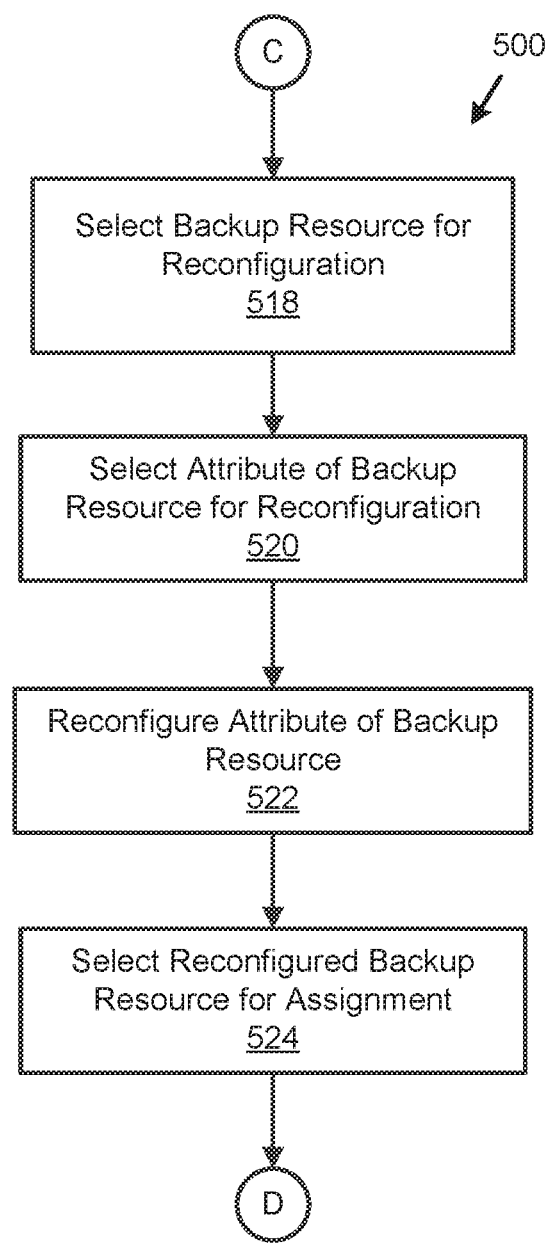
FIG. 5C shows a third portion of a flowchart for implementing the client assignment in accordance with one or more embodiments of the invention.

In one or more embodiments of the invention, the resource controller (104) includes a status engine, status information, a resource manager, a policy store, and an assignment engine to provide the aforementioned functionality and/or assist in performing the methods illustrated in FIGS. 4-5C. For additional details regarding the aforementioned components and the operation of the resource controller (104), See FIG. 2.

In one or more embodiments of the invention, the backup resource pool (106) includes one or more backup resources (108A, 108N). The backup resources (108A, 108N) may store and/or provide data from/to the clients (102A, 102M). The backup resources (108A, 108N) may store/provide data in connection with data storage, backup, or archive services to the clients (102A, 102M). The backup resources (108A, 108N) may store/provide data in connection with other type of services to the clients without departing from the invention.

In one or more embodiments of the invention, the backup resources (108A, 108N) may notify the controller (104, FIG. 1) of a load state of the backup resources to assist the controller (104, FIG. 1) when assigning clients to backup resources. The load state may indicate whether/to what extent the backup resource may take on new clients without becoming overloaded. In one or more embodiments of the invention, the backup resources (108A, 108N) may notify the controller (104, FIG. 1) by sending status information indicating the load state of the respective backup resource. For additional details regarding load state and actions that a controller may take, See FIG. 2.

In one or more embodiments of the invention, the backup resources (108A, 108N) may be computing devices, see, e.g., the computing device of FIG. 11. The computing devices may be, for example, mobile phones, tablet computers, laptop computers, desktop computers, cloud computing systems, computing clusters, or servers. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The backup resources (108A, 108N) may be other types of computing devices without departing from the invention.

In one or more embodiments of the invention, the backup resources (108A, 108N) may be a virtual machines, or other virtual entities that utilizes physical computing resources, executing on one or more computing devices. The computing devices may be, for example, mobile phones, tablet computers, laptop computers, desktop computers, cloud computing systems, computing clusters, or servers. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to execute a virtual machines that perform the functions described in this application.

In one or more embodiments of the invention, a backup resource (108) may be a media server, which hosts digital media (e.g., digital videos, audio, or picture files) and provides the clients (102A, 102M) with on-demand access to the digital media. In one or more embodiments of the invention, a backup resource (108) may be, but is not limited to, a: (i) deduplication system, which include functionality to deduplicate all or a portion of the files received from the client prior to storing the files (or portions thereof) in the persistent storage, (ii) deduplication system (as described in (i)), which is implemented as virtual appliances or machines on a computing device, (iii) cloud-based storage system, where the client issues read and write requests to a cloud service, where the cloud service processes the requests to store files (or portions thereof) on a remotely located persistent storage (which may or may not be distributed) or to retrieve files (or portions thereof) from a remotely located persistent storage (which may or may not be distributed), (iv) cloud-based storage system (as described in (iii)), which includes functionality to deduplicate the file (or a portion thereof) prior to storing the file, (v) storage system (which may be implemented as virtual applications) which do not deduplicate the files (or portions thereof) prior to storing the files in the persistent storage.

In one or more embodiments of the invention, the backup resource pool (106) may include backup resources of varying types. A type of a backup resources may be defined based on the type of services that it offers to a client and/or the hardware resources available to the backup resources. For example, the backup resource (108A) may provide deduplication services to clients while backup resource (108N) data archival services. In another example, the backup resource (108A) may include eight processors sufficient to provide services to ten clients while backup resource (108N) may include four processors sufficient to provide services to five clients.

In one or more embodiments of the invention, the backup resources of the backup pool (106) are dynamically adjusted. More specifically, backup resources may be added to or removed from the backup pool (106) at any point in time. In one or more embodiments of the invention, a type of backup resource may be added to the backup pool (106) based on a type of service requested by a client. For example, backup resources that have a large amount of solid state storage may be added to the backup resource pool (106) in response to clients requesting services that require fast access to data stored in the backup resources.

Figure 2:
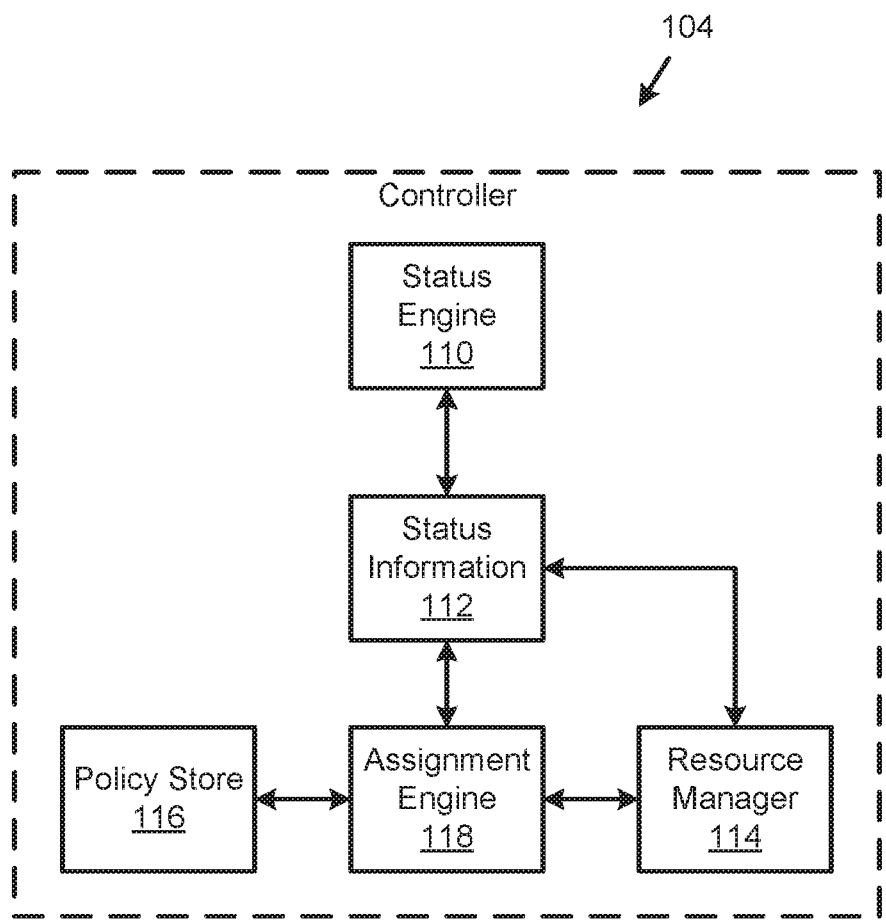
FIG. 2 shows a block diagram of a resource controller in accordance with one or more embodiments of the invention.

FIG. 2 shows a diagram of a resource controller (104) in accordance with one or more embodiments of the invention. The resource controller (104) may be employed to determine which backup resources may receive a client assignment based on the load state of the backup resources in accordance with one or more embodiments of the invention. The resource controller (104) includes a status engine (110), status information (112), a resource manager (114), a policy store (116), and an assignment engine (118). Each component of the resource controller (104) is described below.

In one or more embodiments of the invention, the status engine (110) may be one or more processes or computing devices that include one or more processors (not shown) and memory (not shown). The status engine (110) provides functionality to obtain the status information (112) from the backup resources (108A, 108N). For instance, the status engine (110) may continuously update the status information (112) of the backup resources (108A, 108N) and store the status information for evaluation by the assignment engine (118) and/or the resource manager (114) as further described herein with respect to FIGS. 4 and 5.

The status engine (110) may update the stored status information (112) on a static polling frequency, a dynamically allocated polling frequency, or in response to the occurrence of an event, such as receipt of a backup resource assignment request as further described herein. For instance, the status engine (110) may update the status information less frequently during periods of the day that experience relatively low client loads, but may update the status information more frequently during periods of the day that experience relatively high client loads. The status engine (110) may update the status information after a fixed period of time or upon receipt of a backup resource assignment request from a client. The status engine (110) is operably connected to the status information (112), the backup resource pool (106) of FIG. 1, and the backup resources (108A, 108N) of FIG. 1.

The status information (112) may be a data structure, including but not limited to a database, table, or an associative array, which stores various load parameters indicating the client load of one or more backup resources. The status information (112) includes one or more load parameters that are indicative of when a backup resource is overloaded or underloaded. The load parameters may indicate processor utilization, processor load, the number of processes running, memory utilization (virtual, physical, or both), data storage utilization, data read/write speeds, network utilization, power utilization, component temperature (e.g., processor temperature or memory temperature), the number of clients assigned to the backup resource, any other suitable parameter for assessing the load or performance of the backup resource, or any combination thereof. The status information (112) may be a condition or state of the process interacting with the clients (e.g., a file storage or backup process), the underlying computing device running the process interacting with the clients, or both. The status information (112) may also include an identifier for the backup resource associated with the status information, a time stamp of when the load parameter was obtained, and the values for the load parameter(s) obtained.

Utilization may refer to the amount of computing resources used relative to the total amount of computing resources available. For instance, a value of 50% memory utilization indicates that half the memory resources are being used on a backup resource. Likewise, a value of 20% CPU utilization refers to 20% of the CPU resources being used on a backup resource. As used herein, the processor load may refer to a weighted average of the number processes that are in a runnable or uninterruptable state. A process in a runnable state is either using the processor or waiting to use the processor.

The load parameter may specify a rate of use of a computing resource (e.g., processor cycles, transitory memory space, network communication bandwidth, and disk input-output) of a backup resource. For instance, the rate of use of a computing resource may include a processor utilization, a memory utilization, a network bandwidth utilization, and persistent storage utilization, or a combination thereof. The load parameter may specify a concurrency of use of a backup resource including but not limited to a cardinality of a clients that utilize the backup resource or a cardinality of processes executing on the backup resource. The load parameter may also specify a condition of a backup resource including a power consumption of the backup resource or a temperature of a component of the backup resource.

The status information (112) may also include a utilization of an attribute of the backup resource relative to the total amount of the attribute that can be reconfigured on the backup resource or a computing device. The attribute may be a computing resource that can be reconfigured on the backup resource including but not limited to a number of processors or cores, transitory memory size, persistent storage size, network bandwidth capacity, or any other computing resource. For instance, the backup resource may have more memory slots available for memory to be installed. The status information may indicate the number of memory slots used relative to the number of slots available for expansion.

In one or more embodiments, the backup resource may also be a virtual machine, which can be reconfigured to utilize more computing resources on the physical server hosting the virtual machine. For instance, the physical server hosting the virtual backup resource may have more memory that can be allocated to the backup resource. The status information (112) may include the utilization of a virtual attribute that can be added or allocated to the backup resource.

Table 1 below provides non-limiting examples of status information that may be obtained by the status engine (112) for two backup resources (108A, 108B):

TABLE 1

Example Status Information

| Backup Resource | Query Time | No. of Clients | CPU Utilization | Memory Utilization | CPU Cores Allocated | Memory Allocated |
|---|---|---|---|---|---|---|
| 108A | 1506696276 | 23 | 10% | 14% | 20% | 25% |
| 108B | 1506696276 | 10 | 20% | 25% | 20% | 25% |

As shown, Table 1 includes columns for the backup resource identifier, the time at which the status information was obtained, the number of clients assigned to the backup resource, the CPU utilization of the backup resource, and the memory utilization of the backup resource. The status information also includes columns for the utilization of attributes allocated to the backup resources. The column for CPU cores allocated provides a percentage for the number of CPU cores allocated to the backup resource relative to the total number of CPU cores that can be allocated to the backup resource. The column for the memory allocated is a percentage for the memory allocated to the backup resource relative to the total amount of memory that can be allocated to the backup resource. In this example, the query time is represented as epoch time, but the query time may also be used in any other format. It should be appreciated that status information may contain any number of load parameters or load states of the respective backup resources. The status information (112) may be stored in memory and may be accessible to the status engine (110), the resource manager (114), and the assignment engine (118). More specifically, the status information (112) may be operably connected to these components of the resource controller (104).

In one or more embodiments of the invention, the resource manager (114) may be one or more processes or computing devices that include one or more processors (not shown), memory (not shown), and an output device (not shown). The resource manager (114) assesses the client load of the backup resources according to one or more load policies in the policy store (116) and the status information (112). Upon determining the client load, the resource manager (114) may reconfigure a backup resource, instantiate a new backup resource in the backup pool, remove a backup resource from the backup pool, or continue to monitor the client load as described herein with respect to FIGS. 5A-5C.

Figure 6:
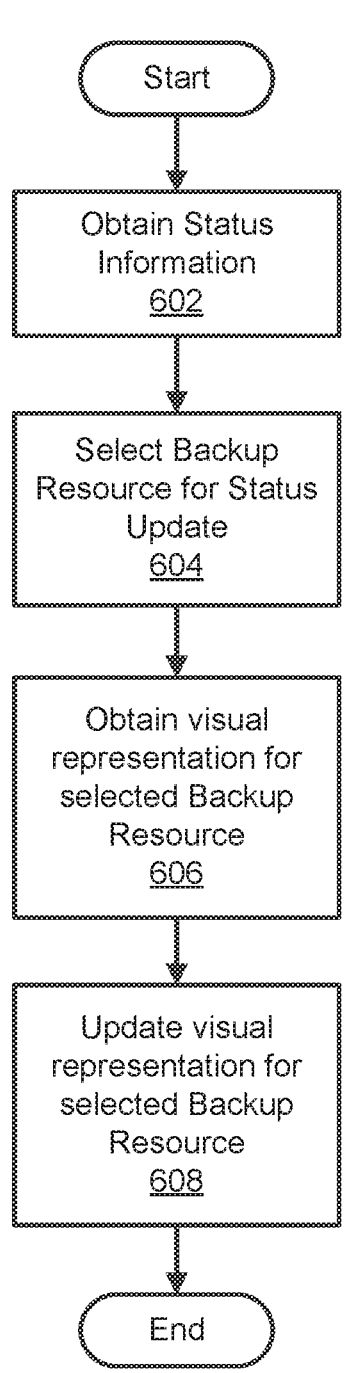
FIG. 6 shows a flowchart for updating a visual representation of a backup resource in accordance with one or more embodiments.
Figure 7:
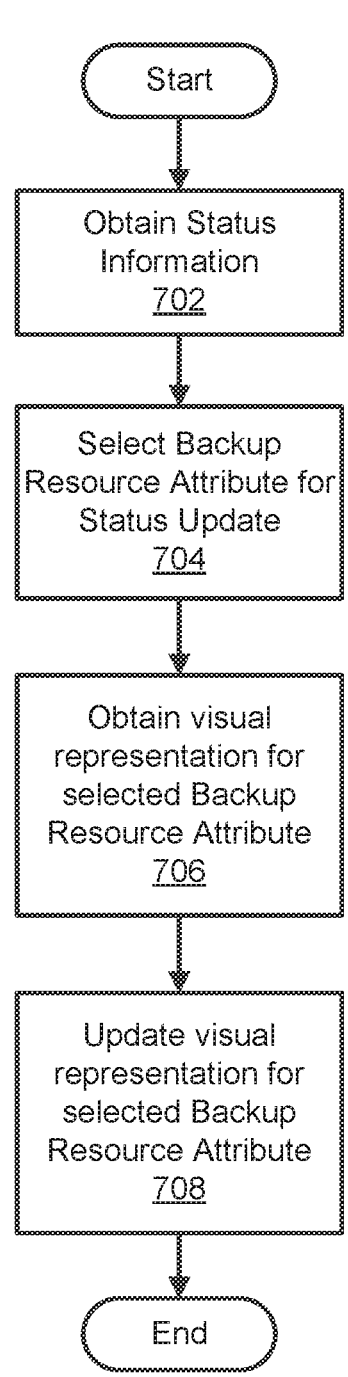
FIG. 7 shows a flowchart for updating a visual representation of an attribute of the backup resource in accordance with one or more embodiments.

The resource manager (114) may identify the visual representation of the backup resource and/or the attributes of the backup resources based on the status information obtained as further described herein with respect to FIGS. 6 and 7. The resource manager (114) may include an output device to provide a visual representation of the load state of the backup resources and/or the load state of the attributes of the backup resources. The visual representation may specify a color, symbol, label, pattern, any other graphical element, or any combination thereof to visually display the load state of the backup resource or attribute. For instance, the visual representation may provide that green represents an underloaded state, yellow represents a normal load state (i.e., a load state that is not underloaded or overloaded), and red represents an overloaded state.

The resource manager (114) may evaluate the client load of the backup resources based on a polling frequency or the occurrence of an event, such as receipt of the backup resource assignment request from a client. The resource manager (114) may monitor the status information (112) for any updated information and trigger evaluation of the client load of a backup resource based on the occurrence of the update. The resource manager (114) may be operably connected to the status information (112), the policy store (116), and the backup resources (108A, 108N) of FIG. 1. The resource manager (114) may update the policy store (116), the status information (112), or both.

In one or more embodiments of the invention, the policy store (116) may be a data structure which stores predetermined or dynamically generated load polices for assessing the client load of the backup resources (108A, 108N) of FIG. 1. The policy store (116) may be, for example, a database, table, or an associative array of one or more load policies that are used to identify when a backup resource has a load state that is overloaded or underloaded. A load policy may specify a load state of a backup resource based on the status information. The load policy may specify a function of a degree of utilization of a backup resource or more than one backup resource. This function may specify that a backup resource is overloaded when the degree of utilization of the backup resource exceeds a threshold. In the case of evaluating an aggregate load state of the backup resource pool, the function may specify that the backup resources are overloaded when an aggregate degree of utilization of the backup resources exceeds a threshold. An aggregate load policy may include an aggregate load state that specifies that the backup resources are overloaded when an aggregate degree of utilization of the backup resources exceeds a threshold.

A degree of utilization may indicate the extent a computing resource is being used or a measure of the performance of the computing resource. For instance, the value of a load parameter may represent a degree of utilization of the backup resource. An aggregate degree of utilization may be the gross value, average value, mean value, median value, or a statistical measure of a given load parameter exhibited across the backup resources. The aggregate degree of utilization as a gross value may be the total number of clients assigned to the backup resources or the total number of backup resources assigned in the backup resource pool. The aggregate degree of utilization may also be the total amount of computing resources used by the backup resources relative to the total amount available.

The load policy may include a load state that specifies that a backup resource is overloaded when a load parameter of the status information for the selected backup resource exceeds a threshold for that load parameter. For instance, the load policy may specify a load state that the backup resource is overloaded when the CPU utilization or memory utilization exceeds a given threshold. Likewise, to identify an underloaded state, the load policy may include a load state that a backup resource is underloaded when a load parameter of the status information for the selected backup resource is below a threshold for that load parameter.

Table 2 below provides examples of load policies that may be used by the resource manager (114) to identify an overloaded or underloaded backup resource:

TABLE 2

Example Load Policies

| Policy Identifier | No. of Clients | CPU Utilization | Memory Utilization |
|---|---|---|---|
| 1 | 70 | 30% | 30% |
| 2 | 25 | 50% | 20% |
| 4 | 3 | 3% | 3% |
| 5 | 5 | 5% | 5% |
| 6 | 200 | 55% | 80% |

As shown, Table 2 includes thresholds used to identify when a backup resource is overloaded or underloaded for given load parameters. In Table 2, the policies include thresholds for the number of clients assigned to the backup resource, the CPU utilization, and the memory utilization. It should be appreciated that load policies may contain any number of thresholds for load parameters. The policies also include a policy identifier, which may be used by the resource manager (114) to select a given policy for evaluation. The first and second load policies may be used to identify an overloaded backup resource and the next two load policies may be used to identify an underloaded backup resource. More specifically, a backup resource may be overloaded if the load parameter exceeds the given threshold for that parameter; whereas a backup resource may be underloaded if the load parameter is below the given threshold for that parameter.

In Table 2, the last load policy may be used to evaluate the aggregate degree of utilization of the backup resources. For instance, maximum number of clients assigned to the backup resources in the backup resources is set as 200 clients. The aggregate thresholds for CPU and memory utilization may be thresholds for the gross, mean, or median values of utilization for the backup resources. More specifically, the backup resources may not be in compliance with the CPU utilization threshold if the mean CPU utilization of the backup resources exceeds the CPU utilization threshold in the last load policy of Table 2. The resource controller (104) may take corrective measures as further described herein with respect to FIGS. 5A-5C.

The backup resources may be assigned to the same load policy or different policies. For instance, some backup resources may be assigned to the first policy of Table 2, and other backup resources may be assigned to the second policy of Table 2. The load policies may reflect the characteristics of the components possessed by a given backup resource. For instance, the load policy may be set differently based on the number of processors or storage capacity of a backup resource. The load policy may reflect the functionality (data backup/archive or file storage) that the backup resource is providing to its clients. Different policies may be used at different times of a given time period (e.g., hour, day, week, or month) depending on the client load exhibited by the backup resources. Thresholds for the load policy may be a fixed value or a dynamically allocated value, e.g., a percentage of a moving average, median, or mean.

The policy store (112) may be stored on memory and accessible to the assignment engine (116). More specifically, the policy store (112) may be operably connected to the assignment (116) of the resource controller (104). The assignment engine (118) may alter the policy store (112) at various times to react to the client load exhibited by the backup resources.

In one or more embodiments of the invention, the assignment engine (118) assigns a client to a backup resource in the backup pool as further described herein with respect to FIGS. 5A-5C. The assignment engine (118) may be one or more processes or computing devices that include one or more processors (not shown) and memory (not shown).

While the various steps in the following flowcharts are presented and described sequentially, one of ordinary skill will appreciate that some or all of the steps may be executed in different orders, may be combined or omitted, and some or all of the steps may be executed in parallel.

Figure 3:
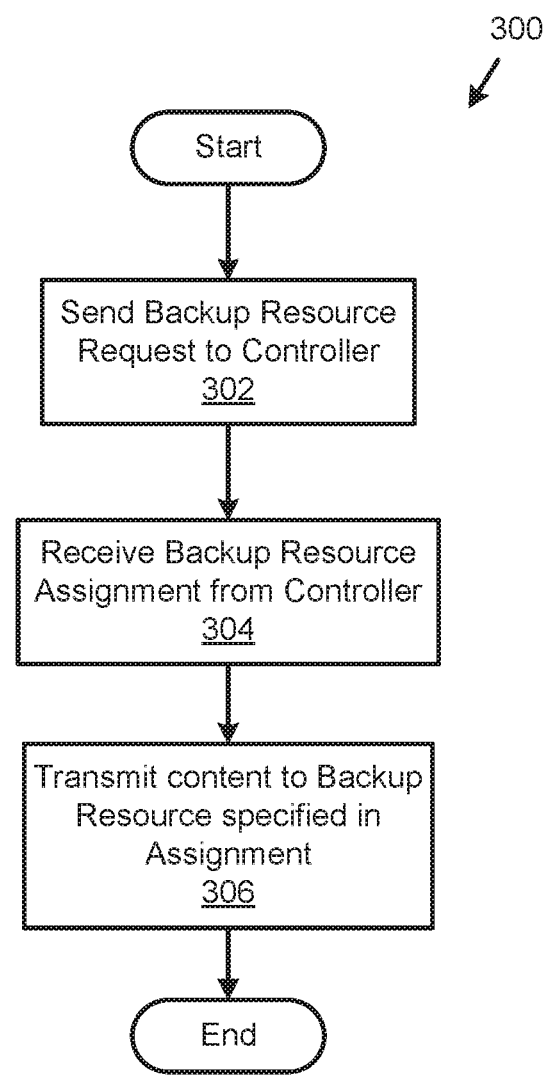
FIG. 3 shows a flowchart for assigning a backup resource to a client in accordance with one or more embodiments of the invention

FIG. 3 shows a flowchart of a method (300) for storing data in a backup resource.

At block (302), the client sends a backup resource request to the resource controller (104).

In one or more embodiments of the invention, when a client initially accesses the system (100), the client may request assignment of a backup resource to provide services to the client. For example, on startup, the client may send the backup resource request, or the backup resource request may be sent when an application on the client is opened or installed on the client. The backup resource request may specify the type of service requested by the client, including backup services or file storage services. The assignment engine (118) may evaluate the request to select an appropriate backup resource for the client.

At block (304), the client receives a backup resource assignment from the resource controller (104).

In one or more embodiments of the invention, upon receiving the assignment request, the assignment engine (118) selects an existing backup resource from the backup resource pool or the backup resources enabled for client assignment as further described herein with respect to FIGS. 5A-5C.

In one or more embodiments of the invention, the selection of the backup resource employs a round-robin selection process, a priority-based selection process (e.g., based on previous status information obtained from the backup resources, the type of components possessed by a given backup resource, or any suitable priority), a random selection process, any suitable selection method, or a combination thereof. The assignment engine (118) may search the status information (112) to identify the backup resources enabled for assignment and exclude from selection any backup resources that may be disabled for assignment as further described herein with respect to FIGS. 5A-5C. The backup resource assignment may include a unique identifier for the backup resource selected for the client, including but not limited to a unique label (e.g., a universally unique identifier), a network address, a hardware address, a fully qualified domain name, any other identifier, or a combination thereof.

At block (306), upon receiving the backup resource assignment, the client may begin utilizing the backup resource as a storage device or a backup/archive server.

In one or more embodiments of the invention, the client utilizes the backup resource for the service assigned to the client, such as file storage or backup services. For example, the client may transmit content to the backup resource specified in the assignment message for file storage or as a backup/archive of the content. As previously discussed, from the client's perspective, the backup resource may be a storage device or a remote server or process which provides data backup or archive services.

The method may end following block (306).

FIG. 4 shows a flowchart of a method (400) for obtaining the status information from the backup resources (108A, 108N) of FIG. 1.

At block (402), the status engine (110) may select a backup resource in the back pool from which to query status information.

In one or more embodiments of the invention, the selection of the backup resource employs a round-robin selection process, a priority-based selection process (e.g., based on previous status information obtained from the backup resources, the type of components possessed by a given backup resource, or any suitable priority), a random selection process, any suitable selection method, or any combination thereof.

At block (404), the status engine (110) sends a status request to the selected backup resource.

In one or more embodiments of the invention, the status request may be a message, which upon receipt by the backup resource triggers the backup resource to collect status information, which is indicative of the client load of the backup resource and/or the availability of an attribute of the backup resource to be reconfigured. The status request may specify the load parameters to which the status information must contain. This allows the status engine to update particular load parameters at different frequencies or times. The backup resource may also be pre-configured to transmit a given set of load parameters upon receipt of the status request.

At block (406), the status engine (110) receives the status information from the selected backup resource.

In one or more embodiments of the invention, the status information includes the load parameters obtained by the backup resource in response to the status request.

At block (408), the status information (112) for the selected backup resource may be updated with the received status information.

In one or more embodiments of the invention, the status information (112) may be stored in a data structure and used for determining client assignment among the backup resources as described herein.

The method may end following block (408).

The method (400) may be repeated for all or some of the backup resources in the backup pool. The method (400) may be performed serially or in parallel for the backup resources in the backup pool. The method (400) may also be repeated after a set period of time to update the status information. For instance, the status engine (110) may obtain the status information for a backup resource every minute, five minutes, hour, five hours, or any other period of time.

FIGS. 5A-C show a flowchart of a method (500) for assigning a client to a backup resource based on the status information (112) collected by the status engine (110) and a load policy in the policy store (116) of FIG. 2.

At block (502), the assignment engine (118) receives a backup resource request from a client.

In one or more embodiments of the invention, the client may request a backup resource from the assignment engine (118). The backup resource may provide file storage or backup services to the client. The backup resource request may specify the type of service requested by the client, including backup services or file storage services, and the assignment engine (118) may evaluate the request to select the appropriate backup resource for the client.

At block (504), the assignment engine (118) obtains the status information (112) for the backup resources.

In one or more embodiments of the invention, the assignment engine (118) may read the status information currently stored or direct the status engine (110) to update the status information for the backup resources.

In one or more embodiments of the invention, the status information (112) may include load parameters indicative of the client load of the backup resources.

At block (506), the assignment engine (118) evaluates the status information to determine the load state of the backup resources (108A, 108N) for selecting a backup resource available for assignment with the client that submitted the assignment request.

In one or more embodiments of the invention, the assignment engine (118) may determine that a load state of a backup resource or the backup resource pool is overloaded, and in this state, the backup resource is not available for assignment. To make this determination, the assignment engine (118) may compare the status information (112) to a load policy in the policy store (116) to identify if a backup resource is overloaded or the backup resource pool as a whole is overloaded. More specifically, if any backup resource is overloaded, the assignment engine (118) identifies those backup resources as not being available for assignment. The assignment engine (118) may temporarily disable the overloaded backup resource from receiving new clients by updating the status information for the backup resource. For instance, the assignment engine (118) may set a load parameter that indicates whether the backup resource is available for servicing new clients in the status information (112). The assignment engine (118) may check this load parameter before selecting the backup resource for assignment as described herein with respect to FIG. 3.

In one or more embodiments of the invention, the status information of the backup resource pool may be evaluated based on an aggregate degree of utilization as previously discussed. The load policy may specify the load state of the backup resources as a function of an aggregate degree of utilization of the backup resources, such as a threshold for the mean or gross memory utilization of the backup resource pool. The load state of an individual backup resource may also be evaluated, but instead based on the status information available for that backup resource. The load policy may specify the load state of the backup resources as a function of the degree of utilization of a backup resource, such as a threshold for the memory utilization of the backup resource.

At block (508), the assignment engine (118) selects an existing backup resource from the backup resource pool for assignment.

In one or more embodiments of the invention, the assignment engine (118) may search the status information (112) to identify the backup resources enabled for assignment and make the selection among those backup resources. The selection of the backup resource may employ a round-robin selectin process, a priority-based selection process (e.g., based on previous status information obtained from the backup resources, the type of components possessed by a given backup resource, or any suitable priority), a random selection process, any suitable selection method, or any combination thereof.

At block (510), in response to the determination that any one or more of the backup resources are not available for client assignment, the resource manager (114) evaluates the status information to determine whether any of the backup resources are available for reconfiguration to increase the client capacity of one or more backup resources.

In one or more embodiments, the resource manager (114) may evaluate status information of the backup resources to identify the processing capacity of the attribute. More specifically, the resource manager (114) compares the processing capacity of the attribute allocated to the backup resource with the total amount of processing capacity available for reconfiguration and identifies any backup resources that can be reconfigured. The attribute may be a computing resource, including but not limited to CPU cores, transitory memory, persistent storage, or network bandwidth capacity. The processing capacity of the attribute may include a processor capacity, transitory memory capacity, persistent storage capacity, and network bandwidth capacity.

The processor capacity may include the number of processor cores or the clock speed of the processor. The transitory memory capacity may include the amount of transitory memory available for storage. The persistent storage capacity may include the amount of disk space available for storage. The network bandwidth capacity may include the maximum throughput rate available for data transfer.

In one or more embodiments, the resource manager (114) may evaluate the availability of reconfiguring backup resources independent of the decision block (506). More specifically, the resource manager (114) may evaluate the status information to identify any backup resources that are overloaded and available for reconfiguration. This allows the resource controller (104) to take correct measures to alleviate an overloaded backup resource.

At block (518), the resource manager (114) selects a backup resource for reconfiguration to increase the client load capacity of the backup resource. The selection may be made among the backup resources that were previously identified as being available for reconfiguration. The selection of the backup resource may employ a round-robin selectin process, a priority-based selection process (e.g., based on previous status information obtained from the backup resources, the type of components possessed by a given backup resource, or any suitable priority), a random selection process, any suitable selection method, or any combination thereof.

At block (520), the resource manager (114) may select an attribute of the backup resource to be reconfigured. The resource manager (114) may identify the attributes of the backup resource available for reconfiguration and select one or more of those attributes for reconfiguration.

In one or more embodiments, the selection of the attribute may employ a round-robin selectin process, a priority-based selection process (e.g., based on previous status information obtained from the backup resources, the type of attributes possessed by a given backup resource, or any suitable priority), a random selection process, any suitable selection method, or any combination thereof. For instance, the resource manager (114) may identify that the memory is overloaded and that the memory capacity of the backup resource is available for expansion. The resource manager (114) may select the memory as the attribute for reconfiguration.

The attribute selected for reconfiguration need not be overloaded. Suppose that memory utilization is overloaded for the backup resource. Suppose also that the memory capacity and processor capacity are available for expansion. The resource manager (114) may select the memory and/or the CPU cores as the attribute(s) for reconfiguration.

At block (522), the resource manager (114) reconfigures the selected attribute of the backup resource to increase the client load capacity of the backup resource.

In one or more embodiments, the resource manager (114) reconfigures the attribute by increasing the processing capacity of the attribute of the backup resource. The resource manager (114) may increase the processing capacity of the attribute by adding or allocating more computing resources to the backup resource. The resource manager (114) may increase the processing capacity of the attribute by making available computing resources pre-installed on the backup resource. Suppose the backup resource has more than one network interface with a single network interface configured for network communication. The resource manager (114) may increase the network bandwidth by aggregating the network interfaces to create a bonded interface.

In one or more embodiments, the backup resources may be operating in a virtual context. More specifically, a backup resource may be a guest virtual machine operating on a physical host machine, such as a computing device. In the virtual context, the resource manager (114) may increase the processing capacity of the attribute by directing a hypervisor of the host machine to increase the computing resources allocated to the guest backup resource. For instance, the host machine may have half of its transitory memory allocated to the guest backup resource. The resource manager (114) may send instructions to the hypervisor of the host machine to allocate more memory to the guest backup resource.

The amount of processing capacity allocated to the backup resource for a given attribute may depend on the degree to which the backup resource is overloaded for that attribute. The backup resource may be reconfigured by increasing the processing capacity by an amount that would allow the backup resource to be in compliance with the load policy. For instance, the backup resource may be out of compliance with respect to memory utilization under a load policy. The resource manager (114) may allocate enough memory to the backup resource to bring the backup resource in compliance with the load policy.

In one or more embodiments, the resource manager (114) reconfigures the attribute by configuring the attribute to load balance the computing resources. For instance, suppose the backup resource uses hard disk drives for persistent storage and has solid state disks available for persistent storage. The resource manager (114) may reconfigure the backup resource to utilize the solid state disks for applications which necessitate the read and write speeds offered by the sold state disks. Suppose the backup resource has more than one network interface with a single network interface configured for network communication. The resource manager (114) may reconfigure the network interfaces to load balance traffic across the network interfaces. Some of the network interfaces may be configured as slaves, and outgoing traffic may be distributed according to the current load (computed relative to the speed) on each network interface configured as a slave.

At block (524), the assignment engine (118) selects the reconfigured backup resource for client assignment.

In one or more embodiments, the other backup resources may have been identified as being overloaded and the assignment engine (118) is able to select a reconfigured backup resource with an increased client load capacity. This allows the resource controller (104) to adapt to the client load of the backup resources and mitigate situations where a client is assigned to an overloaded backup resource.

At block (512), in response to the determination that the backup resources are not available for reconfiguration, the resource manager (114) adds a new backup resource in the backup pool.

In one or more embodiments of the invention, the resource manager (114) may take corrective action in response to an overloaded backup resource to provide a backup resource that is available for assignment by adding the new backup resource.

In one or more embodiments of the invention, the resource manager (114) may add a new backup resource by binding the requirements for resources, such as memory, CPU, networking, and persistent storage, to a physical instance of appropriate computing resources of a computing device, such as a physical server and operably connecting the new backup resource to the backup pool. The resource manager (114) may also determine an execution location of the new backup resource, which is not exhibiting an overloaded state, and add the new backup resource to utilize computing resources of the execution location. The execution location may include computing resources, which host virtual instances of the backup resources. Adding may occur when the resource manager (114) selects the appropriate virtual resources (e.g., processor, memory, and persistent storage) to be hosted by a physical server. Adding may also occur by waking up a backup resource from hibernation or booting a backup resource previously configured on a computing device. In general, adding may include taking measures to operably connect a backup resource to the resource controller and a network in communication with the clients.

At block (514), the assignment engine (118) selects the new backup resource for assignment with the client.

In one or more embodiments of the invention, the other backup resources may have been identified as being overloaded and the assignment engine (118) is able to select a new backup resource without a client load for client assignment. This allows the resource controller (104) to adapt to the client load of the backup resources and mitigate situations where a client is assigned to an overloaded backup resource.

At block (516), the assignment engine sends the backup resource assignment to the client.

In one or more embodiments of the invention, the backup resource assignment may include a unique identifier for the backup resource selected for the client. The client utilizes the backup resource for the service assigned to the client, such as file storage or backup services.

The method may end following block (516).

FIG. 6 shows a flowchart of a method (600) for updating the visual representation of a backup resource, in accordance with one or more embodiments.

At block (602), the resource manager (114) obtains the status information (112) for the backup resources.

In one or more embodiments of the invention, the assignment engine (118) may read the status information currently stored or direct the status engine (110) to update the status information for the backup resources.

In one or more embodiments of the invention, the status information (112) may include load parameters indicative of the client load of the backup resources.

At block (604), the resource manager (114) selects a backup resource to update the visual representation of the backup resource.

In one or more embodiments, the selection of the backup resource employs a round-robin selection process, a priority-based selection process (e.g., based on previous status information obtained from the backup resources, the type of components possessed by a given backup resource, or any suitable priority), a random selection process, any suitable selection method, or a combination thereof. The selection of the backup resource may also be in response to an occurrence of an event, such as a change in the status information for the backup resource.

At block (606), the resource manager (114) obtains the visual representation of the selected backup resource. The resource manager (114) may identify the visual representation based on the status information obtained for the backup resources. The resource manager (114) may identify the visual representation for the backup resource according to an aggregate load state for the number of load parameters that exhibit an overloaded state, underloaded state, and/or a normal load state (i.e., a load state that is not underloaded or overloaded). For instance, the backup resource (114) may identify that all of the load parameters for the backup resource are overloaded. The resource manager (114) may identify the visual representation to indicate that the backup resource is overall overloaded. Suppose, however, that half of the load parameters are overloaded and the other half are underloaded. The resource manager (114) may select a visual representation that indicates that half of load parameters are in an overloaded state regardless of the other load parameters.

At block (608), the resource manager (114) updates the visual representation of the backup resource.

In one or more embodiments, the resource manager (114) updates the display settings of an output device to provide the visual representation of the backup resource. For instance, the resource manager (114) may change the color of the backup resource as represented in a graphical dashboard that provides the load state of the backup resources.

The method may end following block (608).

FIG. 7 shows a flowchart of a method (700) for updating the visual representation of an attribute of a backup resource, in accordance with one or more embodiments. The visual representation of the attribute may represent a degree of utilization of a computing resource of the backup resource including but not limited to CPU load, CPU utilization, transitory memory utilization, persistent storage utilization, etc. For instance, the visual representation of the attribute may correspond to a load parameter obtained for the backup resource.

At block (702), the resource manager (114) obtains the status information (112) for the backup resources.

In one or more embodiments of the invention, the assignment engine (118) may read the status information currently stored or direct the status engine (110) to update the status information for the backup resources.

In one or more embodiments of the invention, the status information (112) may include load parameters indicative of the client load of the backup resources.

At block (704), the resource manager (114) selects a backup resource to update the visual representation of that backup resource.

In one or more embodiments, the selection of the backup resource employs a round-robin selection process, a priority-based selection process (e.g., based on previous status information obtained from the backup resources, the type of components possessed by a given backup resource, or any suitable priority), a random selection process, any suitable selection method, or a combination thereof. The selection of the backup resource may also be in response to an occurrence of an event, such as a change in the status information for the backup resource.

At block (706), the resource manager (114) obtains the visual representation of the attribute of the selected backup resource. The resource manager (114) may identify the visual representation based on the status information obtained for the backup resources. The resource manager (114) may identify the visual representation for the backup resource according to load policies used to identify the load state of the attribute, including but not limited to an underloaded state, an overloaded state, or a normal load (i.e., a load state that is neither underloaded or overloaded). For instance, the backup resource (114) may identify that the load parameter for transitory memory utilization of the backup resource is overloaded based on the status information and load policy. The resource manager (114) identifies the visual representation for the transitory memory utilization to indicate that the attribute is overloaded. The visual representation may specify a color, symbol, label, pattern, any other graphical element, or any combination thereof to visually display the load state of the attribute.

At block (708), the resource manager (114) updates the visual representation of the attribute of the backup resource.

In one or more embodiments, the resource manager (114) updates the display settings of an output device to provide the visual representation of the attribute. For instance, the resource manager (114) may change the color of the attribute as represented in a graphical dashboard that provides the load state of the backup resources.

The following is a set of example scenarios in accordance of various embodiments of the invention. The examples are not intended to limit the invention.

Example 1: Acceptable Client Load

Figure 8A:
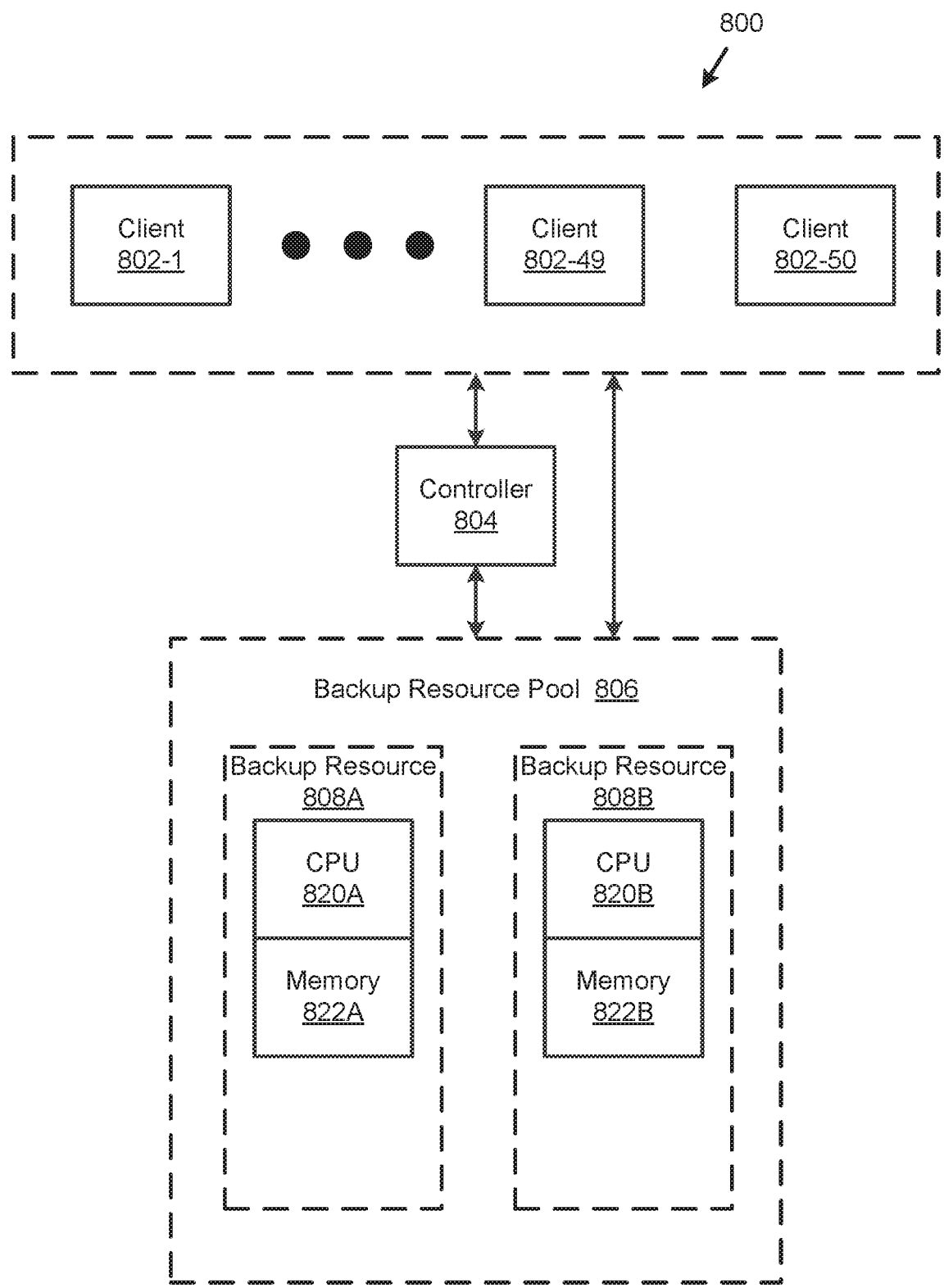
FIG. 8A shows an example of the system in compliance with a load policy in accordance with one or more embodiments of the invention

Consider a scenario in which a client is introduced into the system, and the backup pool has an acceptable client load to assign the client to an existing backup resource. An acceptable client load refers to when none of the backup resources in the backup resource pool exhibit an overloaded state. FIG. 8A shows a diagram of the system (800) operating under such a scenario. Suppose the resource controller (804) evaluates the client load based on the first load policy in Table 2. The backup resources (808A, 808B) are providing backup services to clients (802-1-802-49), which have received backup resource assignments. Each of the backup resources (808A, 808B) include one or more processors (820A, 820B) and transitory memory (822A, 822B).

As shown in Table 3 below, an additional client (802-50) is introduced into the system (800) and sends a backup resource assignment request to the resource controller (804). Upon receipt of the assignment request, the resource controller (804) obtains the status information for the backup resources (808A, 808B) at the first query time. The status information includes the load parameters for number of clients assigned to the backup resource, the CPU utilization, and the memory utilization. The status information also includes the amount of memory allocated to the backup resources (808A, 808B) relative to the total amount of memory available for reconfiguration. As shown in the table, the amount of transitory memory (822A, 822B) allocated to the backup resources (808A, 808B) is half of the capacity that can be allocated as reflected in the status information.

The resource controller (804) evaluates the load state of the backup resources based on the first load policy and the status information, which indicates that the backup resources (808A, 808B) are incompliance with the first load policy of Table 2. More specifically, at the first query time of the status information, the backup resources (808A, 808B) are not overloaded according to the first load policy. The resource controller (804) assigns the client (802-50) to the second backup resource (808B) by sending a backup resource assignment the backup resource (808B). The resource controller (804) also determines that the backup resources (808A, 808B) do not need to be reconfigured.

The resource controller (804) obtains status information for the backup resources (808A, 808B) 60 seconds after the first query. At the second query time, the status information indicates that that the new client (802-50) has been assigned to the second backup resource (808B) and that the backup resources (808A, 808B) are still in compliance with the load policy.

Under the first load policy, none of the backup resources (808A, 808B) are identified as being overloaded by the resource controller (804). In other words, the load parameters in the status information as shown in Table 3 below do not exceed the thresholds in the first load policy of Table 2. Therefore, the backup pool is operating at an acceptable client load, i.e., none of the backup resources are overloaded. As a result, the resource controller (804) does not instantiate an additional backup resource.

TABLE 3

| | | Status Information | | | |
|---|---|---|---|---|---|
| Backup Resource | Query Time | No. of Clients | CPU Utilization | Memory Utilization | Memory Allocated |
| 808A | 1506686400 | 40 | 10% | 14% | 50% |
| 808B | 1506686400 | 9 | 20% | 25% | 50% |
| 808A | 1506686460 | 40 | 11% | 15% | 50% |
| 808B | 1506686460 | 10 | 19% | 29% | 50% |

Figure 8B:
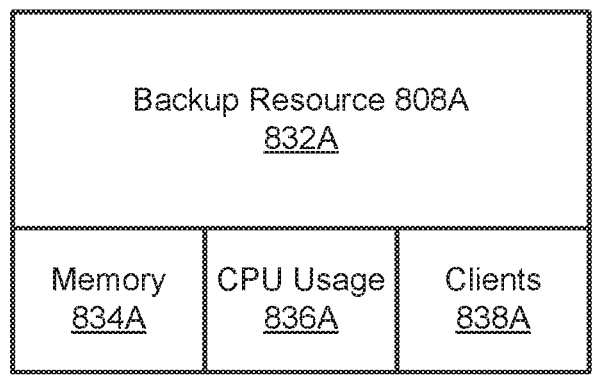
FIG. 8B shows an example of the visual representation of backup resources in compliance with a load policy in accordance with one or more embodiments of the invention.
Figure 8B:
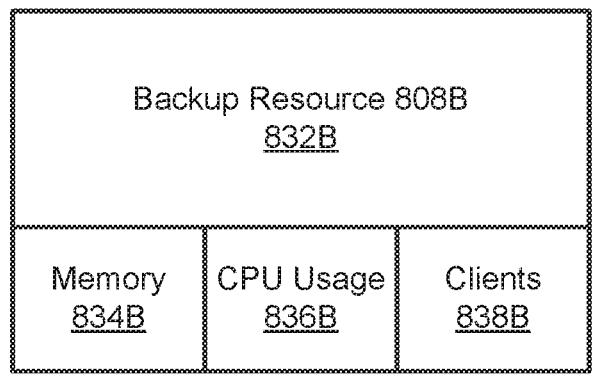

FIG. 8B shows a diagram of visual representations (832A, 832B, 834A, 834B, 836A, 836B, 838A, 838B) of the backup resources (808A, 808B) and their respective attributes in response to obtaining the status information at the first query time of Table 3. The resource controller (804) displays the visual representations (832A, 832B, 834A, 834B, 836A, 836B, 838A, 838B) on an output device (not shown) of a computing device, see, e.g., the computing device of FIG. 11. The visual representation of the attributes (834A, 834B, 836A, 836B, 838A, 838B) correspond to the load parameters for memory utilization, CPU utilization, and the number of clients assigned to the backup resources. The visual representations (832A, 832B) of the backup resources provide an aggregate visual representation relative to the load state of the attributes. As none of the backup resources or attributes are overloaded, the visual representations (832A, 832B, 834A, 834B, 836A, 836B, 838A, 838B) are displayed to indicate their corresponding load state at the first query time of Table 3.

Example 2: Reconfiguring Backup Resource

Figure 9A:
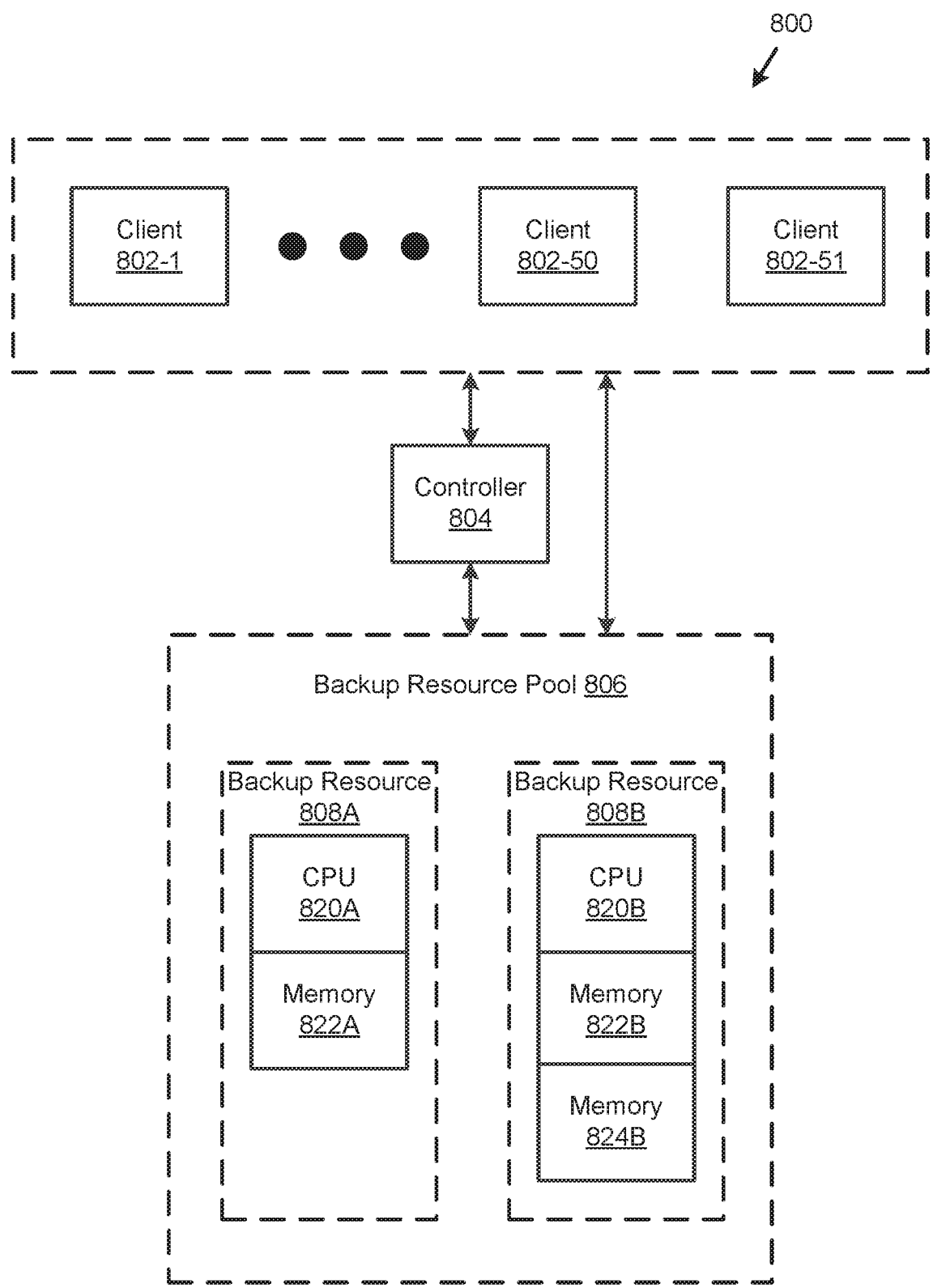
FIG. 9A shows an example of the system operating with an overloaded backup resource that is available for reconfiguration in accordance with one or more embodiments of the invention.

Suppose the resource controller identifies a backup resource having a load state that is overloaded according to the second load policy in Table 2 and the backup resource is also available for reconfiguration. The resource controller takes corrective measures to mitigate assigning any new clients to the overloaded backup resource by reconfiguring the backup resource to increase the client load capacity of the backup resource. FIG. 9A shows a diagram of the system (800) operating under such a scenario. The backup resources (808A, 808B) are providing backup services to clients (802-1-802-50), which have received backup resource assignments. The resource controller (804) receives an assignment request from the client (802-51), and receipt of the assignment request directs the resource controller (804) to obtain status information for the backup resources (808A, 808B). Each of the backup resources (808A, 808B) initially include one or more processors (820A, 820B) and transitory memory (822A, 822B).

As shown in Table 4 below, the resource controller (804) obtains status information for the backup resources (808A, 808B) at separate query times separated by 60 seconds. The resource controller (804) evaluates the load state of the backup resources based on the second load policy in Table 2 and the status information collected at the first query time. At this query time, the resource controller (804) identifies the backup resource (808B) as having a load state that is overloaded. More specifically, the backup resource (808B) is identified as exceeding the load policy for memory utilization.

As a result, the resource controller (804) takes corrective measures to mitigate the newly introduced client (802-51) from being assigned to the overloaded backup resource (808B). The resource controller (804) evaluates the status information to determine whether any of the backup resources (808A, 808B) can be reconfigured to increase the client load capacity. The resource controller (804) identifies that the memory utilization of the backup resource (808B) is overloaded and that the transitory memory can also be expanded. The resource controller (804) reconfigures the backup resource (808B) by increasing the transitory memory capacity of the backup resource, and the resource controller (804) assigns the new client (802-51) to the reconfigured backup resource (808B). As shown in FIG. 9A, the backup resource (808B) includes an additional transitory memory module 824B.

In one or more embodiments, the resource controller (804) may assign the new client (802-51) to any other backup resource which is not overloaded and temporarily disable the backup resource (808B) from being available for client assignment as described herein. This may allow the previously overloaded backup resource to recover from the overloaded state and mitigate any further performance degradation experienced by the existing clients.

At a second query time, the resource controller (804) obtains status information for the backup resources (808A, 808B). The status information obtained at the second query time reflects the reconfigured backup resource (808B) and the newly assigned client (802-51). The status information at this time also indicates that the backup resource (808B) is no longer in an overloaded state as for memory utilization with respect to the second load policy of Table 2.

TABLE 4

Status Information

| Backup Resource | Query Time | No. of Clients | CPU Utilization | Memory Utilization | Memory Allocated |
|---|---|---|---|---|---|
| 808A | 1506646800 | 40 | 10% | 14% | 50% |
| 808B | 1506646800 | 10 | 20% | 25% | 50% |
| 808A | 1506646860 | 40 | 11% | 15% | 50% |
| 808B | 1506646860 | 11 | 19% | 13% | 100% |

Figure 9B:
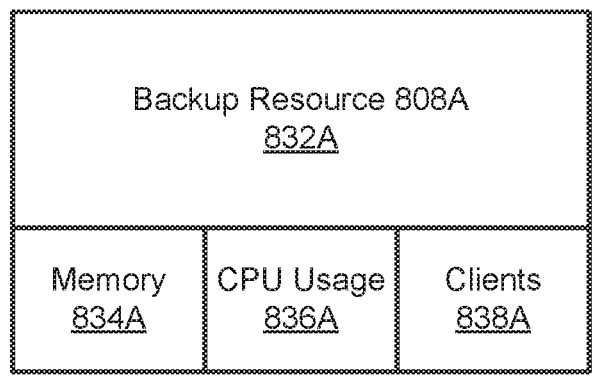
FIG. 9B shows an example of the visual representation of a backup resource out of compliance with a load policy in accordance with one or more embodiments of the invention.
Figure 9B:
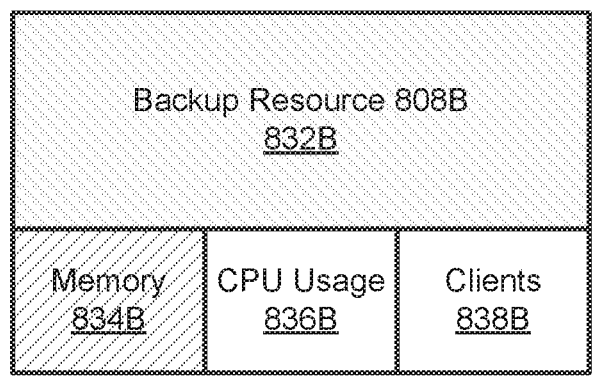

FIG. 9B shows a diagram of visual representations (832A, 832B, 834A, 834B, 836A, 836B, 838A, 838B) of the backup resources (808A, 808B) and their respective attributes in response to obtaining the status information at the first query time of Table 4. The resource controller (804) updates the visual representations (832A, 832B, 834A, 834B, 836A, 836B, 838A, 838B) on an output device (not shown) of a computing device, see, e.g., the computing device of FIG. 11. The visual representation of the attributes (834A, 834B, 836A, 836B, 838A, 838B) correspond to the load parameters for memory utilization, CPU utilization, and the number of clients assigned to the backup resources. The visual representations (832A, 832B) of the backup resources provide an aggregate visual representation relative to the load state of the attributes. More specifically, the visual representation (832B) of the backup resource (808B) indicates that a minority of the attributes is overloaded, whereas the visual representation (834B) for the memory utilization of the backup resource (808B) indicates that this attribute is overloaded.

Example 3: Adding New Backup Resource

Figure 10A:
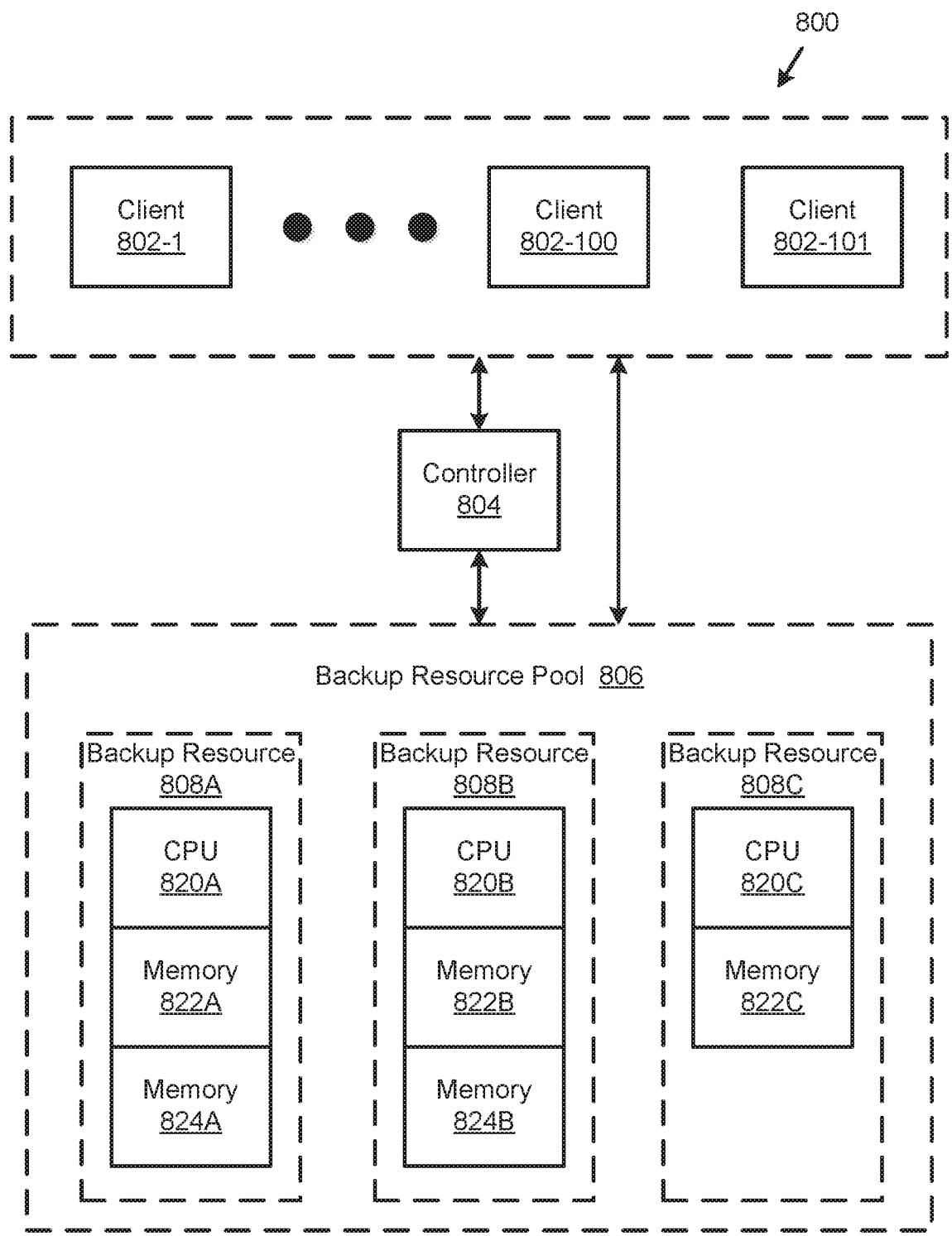
FIG. 10A shows an example of the system operating with overloaded backup resources that are not available for reconfiguration in accordance with one or more embodiments of the invention.

Suppose the resource controller identifies a backup resource having a load state that is overloaded according to the first load policy in Table 2 and also identifies that no backup resources are available for reconfiguration. The resource controller takes corrective measures to mitigate assigning any new clients to the overloaded backup resources by adding a new backup resource to the backup resource pool and/or disabling the overloaded backup resource from receiving new clients. FIG. 10A shows a diagram of the system (800) operating under such a scenario. The backup resources (808A, 808B) are providing backup services to clients (802-1-802-100), which have received backup resource assignments. The resource controller (804) receives an assignment request from the client (802-101), and receipt of the assignment request directs the resource controller (804) to obtain status information for the backup resources (808A, 808B). Each of the backup resources (808A, 808B) initially include one or more processors (820A, 820B) and transitory memory (822A, 822B, 824A, 824B).

As shown in Table 5 below, the resource controller (804) obtains status information for the backup resources (808A, 808B) at separate query times separated by 60 seconds. The resource controller (804) evaluates the load state of the backup resources based on the first load policy in Table 2 and the status information collected at the first query time. At this query time, the resource controller (804) identifies the backup resources (808A, 808B) as having load states that are overloaded. More specifically, the backup resource (808A) is identified as exceeding the load policy for CPU utilization, and the backup resource (808B) is identified as exceeding the load policy for memory utilization.

As a result, the resource controller (804) takes corrective measures to mitigate the newly introduced client (802-51) from being assigned to the overloaded backup resources (808A, 808B). The resource controller (804) evaluates the status information to determine whether any of the backup resources (808A, 808B) can be reconfigured to increase the client load capacity. The resource controller (804) identifies that the CPUs allocated to the backup resources can not be increased and that the transitory memory also cannot be expanded for the backup resources (808A, 808B). The resource controller (804) adds a new backup resource (808C) to the backup resource pool (806) and assigns the new client (802-101) to the new backup resource (808C). As shown in FIG. 9A, the backup resource pool (806) includes the new backup resource (808C). The resource controller (804) also temporarily disables the backup resources (808A, 808B) from being available for client assignment as described herein.

At a second query time, the resource controller (804) obtains status information for the backup resources (808A, 808B, 808C). The status information obtained at the second query time reflects the newly added backup resource (808C) and the newly assigned client (802-51). The status information at this time also indicates that the backup resources (808A, 808B) continue to be in an overloaded state with respect to the first load policy of Table 2. The backup resources (808A, 808B) may remain disabled from receiving new client assignments until the status information reflects the backup resources (808A, 808B) as not being overloaded.

TABLE 5

Status Information

| Backup Resource | Query Time | No. of Clients | CPU Utilization | Memory Utilization | CPU(s) Allocated | Memory Allocated |
|---|---|---|---|---|---|---|
| 808A | 1506646800 | 40 | 40% | 14% | 100% | 100% |
| 808B | 1506646800 | 60 | 20% | 35% | 100% | 100% |
| 808A | 1506646860 | 60 | 60% | 15% | 100% | 100% |
| 808B | 1506646860 | 40 | 19% | 40% | 100% | 100% |
| 808C | 1506646860 | 1 | 3% | 5% | 100% | 50% |

Figure 10B:
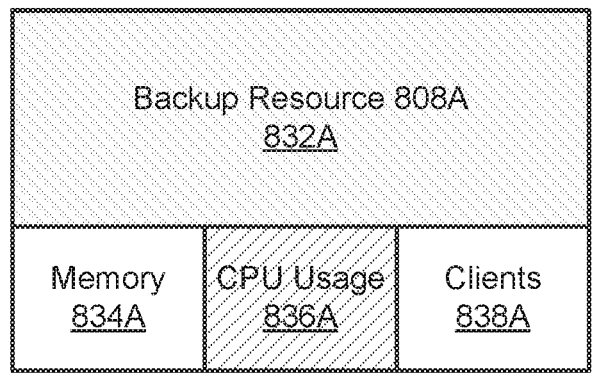
FIG. 10B shows an example of the visual representation of backup resources after adding a backup resource in accordance with one or more embodiments of the invention.
Figure 10B:
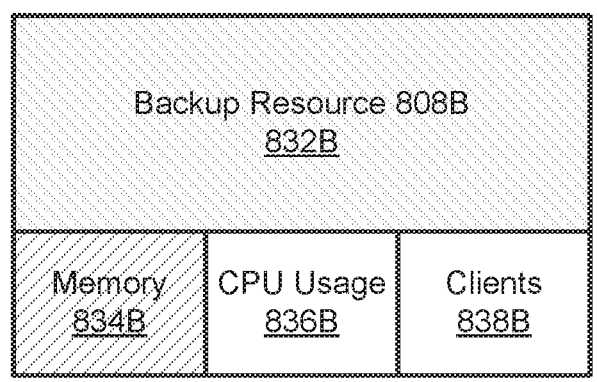
Figure 10B:
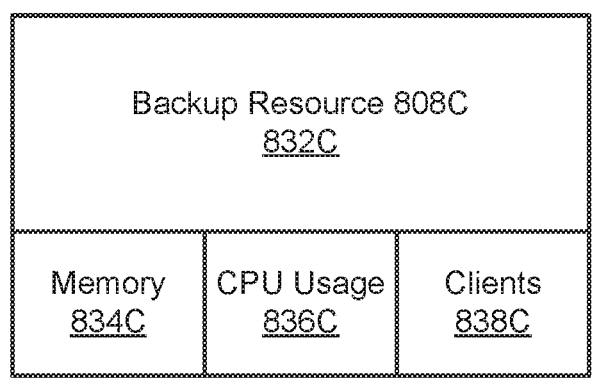

FIG. 10B shows a diagram of visual representations (832A, 832B, 832C 834A, 834B, 834C, 836A, 836B, 836C, 838A, 838B, 838C) of the backup resources (808A, 808B, 808C) and their respective attributes in response to obtaining the status information at the second query time of Table 5. The resource controller (804) updates the visual representations (832A, 832B, 832C, 834A, 834B, 834C, 836A, 836B, 836C, 838A, 838B, 838C) on an output device (not shown) of a computing device, see, e.g., the computing device of FIG. 11. The visual representation of the attributes (834A, 834B, 834C, 836A, 836B, 836C, 838A, 838B, 838C) correspond to the load parameters for memory utilization, CPU utilization, and the number of clients assigned to the backup resources. The visual representations (832A, 832B, 832C) of the backup resources provide a visual representation relative to the aggregate load state of the attributes. More specifically, the visual representations (832A, 832B) of the backup resources (808A, 808B) indicates that a minority of the attributes is overloaded, whereas the visual representation (832C) of the backup resource (808C) indicates that none of the attributes are overloaded.

The visual representation (836A) for the CPU utilization of the backup resource (808A) indicates that this attribute is overloaded. Likewise, the visual representation (834B) for the memory utilization of the backup resource (808B) indicates that this attribute is overloaded.

FIG. 11 shows a diagram of a computing device in accordance with one or more embodiments of the invention. The computing device (1100) may include one or more computer processors (1102), non-persistent storage (1104) (e.g., volatile memory, such as random access memory (RAM), cache memory), persistent storage (1106) (e.g., a hard disk, an optical drive such as a compact disk (CD) drive or digital versatile disk (DVD) drive, a flash memory, etc.), a communication interface (1112) (e.g., Bluetooth interface, infrared interface, network interface, optical interface, etc.), input devices (1110), output devices (1108), and numerous other elements (not shown) and functionalities. Each of these components is described below.

In one embodiment of the invention, the computer processor(s) (1102) may be an integrated circuit for processing instructions. For example, the computer processor(s) may be one or more cores or micro-cores of a processor. The computing device (1100) may also include one or more input devices (1110), such as a touchscreen, keyboard, mouse, microphone, touchpad, electronic pen, or any other type of input device. Further, the communication interface (1112) may include an integrated circuit for connecting the computing device (1100) to a network (not shown) (e.g., a local area network (LAN), a wide area network (WAN) such as the Internet, mobile network, or any other type of network) and/or to another device, such as another computing device.

In one embodiment of the invention, the computing device (1100) may include one or more output devices (1108), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1102), non-persistent storage (1104), and persistent storage (1106). Many different types of computing devices exist, and the aforementioned input and output device(s) may take other forms.

Embodiments of the invention may manage the load on backup resources of a backup pool to maintain a quality of service of the services provided by the backup pool.

The client assignment processes described herein may improve the performance of the interaction between the clients and the backup resources. More specifically, evaluating the client load upon receipt of an assignment request from a new client allows the system to take corrective measures during the assignment process when a backup resource is identified as being overloaded. For instance, the system may reconfigure a backup resource to expand the client capacity of the backup resource. Reconfiguring the backup resource may also result in correcting the overloaded state to an underloaded state, and thus, yielding an improved client experience encountered by the clients assigned to the reconfigured backup resource. The system may also add a backup resource to the backup pool to expand the client capacity of the backup resource pool. This results in the system having more computing resources or backup resources to take on new clients as the backup resources handle existing clients. Adding a new backup resource during client assignment also mitigate a situation where a client is assigned to an overloaded backup resource.

Embodiments of the invention may also respond to a backup resource being overloaded when the aggregate load state of the backup resources is underloaded. This results in an anticipatory process that seeks to prevent assigning any new client to an overloaded backup resource. Providing such a fine threshold allows the system to respond to an overloaded backup resource before any other backup resources exhibit a similar client load.

One or more embodiments of the invention may be implemented using instructions executed by one or more processors in the system. Further, such instructions may corresponds to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:
1. A method for assigning clients to backup resources of a backup pool, the method comprising:
    receiving backup resource requests from the clients;
    assigning a portion of the clients to a first backup resource of the backup pool while the first backup resource is not overloaded;

after assigning the portion of the clients, obtaining status
information for the first backup resource of the backup
pool;
making a first determination that the first backup resource
is overloaded based on the status information and a
load policy, wherein the status information specifies
information regarding a first attribute of the first backup
resource that indicates the first backup resource is
overloaded;
in response to the first determination, determining that a
second attribute of the first backup resource is available
for reconfiguration, wherein the second attribute is
different from the first attribute;
reconfiguring the first and second attributes of the first
backup resource to obtain a reconfigured backup
resource; and
assigning a client, which has not been assigned to the
backup resources, to the reconfigured backup resource.

2. The method of claim 1, wherein the first attribute is processing capacity of the first backup resource, wherein the second attribute is communication capacity.

3. The method of claim 1, further comprising:
after assigning the client to the reconfigured backup
resource, making a second determination that the
backup resources are not available for reconfiguration;
and
in response to the second determination, adding a new
backup resource to the backup pool.

4. The method of claim 1, wherein the load policy specifies a load state of the first backup resource as a function of a degree of utilization of the first attribute.

5. The method of claim 4, wherein the function specifies that the first backup resource is overloaded when the degree of utilization of the first attribute exceeds a threshold.

6. The method of claim 1, wherein the load policy specifies a load state of the backup resources as a function of an aggregate degree of utilization of the backup resources.

7. The method of claim 6, wherein the function specifies that the backup resources are overloaded when the aggregate degree of utilization of the backup resources exceeds a threshold.

8. The method of claim 1, wherein the load policy specifies a load state of the first backup resource of the backup resources as a function of a degree of utilization of the first backup resource.

9. The method of claim 8, wherein the function specifies the load state of the first backup resource is not available for assignment when the degree of utilization of the first backup resource exceeds a threshold.

10. The method of claim 1, wherein the status information specifies a condition of the first backup resource of the backup resources, wherein the condition is one selected from a group consisting of a power consumption of the first backup resource and a temperature of a component of the first backup resource.

11. The method of claim 1, further comprising in response to the first determination, updating a visual representation of the first backup resource.

12. A non-transitory computer readable medium comprising computer readable program code, which when executed by a computer processor enables the computer processor to perform a method for assigning clients to backup resources in a backup pool, the method comprising:
receiving backup resource requests from the clients;
assigning a portion of the clients to a first backup resource
of the backup pool while the first backup resource is not
overloaded;
after assigning the portion of the clients, obtaining status
information for the first backup resource of the backup
pool;
making a first determination that the first backup resource
is overloaded based on the status information and a
load policy, wherein the status information specifies
information regarding a first attribute of the first backup
resource that indicates the first backup resource is
overloaded;
in response to the first determination, determining that a
second attribute of the first backup resource is available
for reconfiguration, wherein the second attribute is
different from the first attribute;
reconfiguring the first and second attributes of the first
backup resource to obtain a reconfigured backup
resource; and
assigning a client, which has not been assigned to the
backup resources, to the reconfigured backup resource.

13. A system, comprising:
clients;
a backup pool comprising a plurality of backup resources;
a resource controller in communication with the clients
and the backup pool, wherein the resource controller
comprises a processor operable to:
receive backup resource requests from the clients;
assign a portion of the clients to a first backup resource
of the backup pool while the first backup resource is
not overloaded;
after assigning the portion of the clients, obtain status
information for the first backup resource of the
backup pool;
make a first determination that the first backup resource
is overloaded based on the status information and a
load policy, wherein the status information specifies
information regarding a first attribute of the first
backup resource that indicates the first backup
resource is overloaded;
in response to the first determination, determine that a
second attribute of the first backup resource is available for reconfiguration, wherein the second attribute
is different from the first attribute;
reconfigure the first and second attributes of the first
backup resource; and
assign a client, which has not been assigned to the
backup resources, to the reconfigured backup
resource.

14. The non-transitory computer readable medium of claim 12, wherein the first attribute is processing capacity of the first backup resource, wherein the second attribute is communication capacity.

15. The system of claim 13, wherein the first attribute is processing capacity of the first backup resource, wherein the second attribute is communication capacity.

* * * * *